(12) United States Patent
Gardner

(10) Patent No.: US 11,358,534 B2
(45) Date of Patent: Jun. 14, 2022

(54) TAILGATE-MOUNTED COLLAPSIBLE STORAGE SYSTEM

(71) Applicant: TruckStash, Inc., Marietta, GA (US)

(72) Inventor: Daniel Gardner, Marietta, GA (US)

(73) Assignee: TruckStash, Inc., Marietta, GA (US)

( * ) Notice: Subject to any disclaimer, the term of this patent is extended or adjusted under 35 U.S.C. 154(b) by 0 days.

(21) Appl. No.: 17/411,019

(22) Filed: Aug. 24, 2021

(65) Prior Publication Data

US 2022/0055543 A1     Feb. 24, 2022

Related U.S. Application Data

(60) Provisional application No. 63/069,624, filed on Aug. 24, 2020.

(51) Int. Cl.
    *B60R 9/06*     (2006.01)
    *B65D 6/16*     (2006.01)

(52) U.S. Cl.
    CPC .............. *B60R 9/065* (2013.01); *B65D 11/18* (2013.01)

(58) Field of Classification Search
    CPC .. B60R 9/06; B60R 9/065; B60R 11/06; B65D 11/18; B65D 11/1806; B65D 11/1813; B65D 11/182; B65D 11/1826; B65D 11/1833; B65D 11/184; B65D 11/1846; B65D 11/186; B65D 11/1866; B65D 11/1873; B65D 11/1893
    USPC ........................................ 224/556, 403, 404
    See application file for complete search history.

(56) References Cited

U.S. PATENT DOCUMENTS

| | | | | |
|---|---|---|---|---|
| 4,215,896 A | * | 8/1980 | Drouin | B60R 11/06 224/404 |
| 4,596,348 A | * | 6/1986 | Stamp | B60R 9/02 224/563 |
| 4,730,760 A | * | 3/1988 | Keller | B60N 3/007 108/18 |
| 5,078,309 A | * | 1/1992 | Hull | B60R 21/026 224/571 |
| 5,671,857 A | * | 9/1997 | Stromberg | B65D 1/225 206/505 |
| 5,992,719 A | * | 11/1999 | Carter, III | B60R 9/00 220/8 |
| 6,129,253 A | * | 10/2000 | Brown | B60R 7/02 224/558 |
| 6,170,724 B1 | * | 1/2001 | Carter | B60R 9/00 224/543 |

(Continued)

FOREIGN PATENT DOCUMENTS

FR     2719821 A1 * 11/1995 ......... B65D 11/1853

*Primary Examiner* — Justin M Larson
(74) *Attorney, Agent, or Firm* — DuBois, Bryant & Campbell, LLP; William D. Wiese

(57) ABSTRACT

The present disclosure relates to a collapsible storage system that may be mounted in a fixed position and attached to the vehicle using its tailgate without the use of any tools. The collapsible storage system may be used to securely store items in the bed of a pickup truck while in use and may be collapsed into a configuration that reduces the amount of space in the truck bed that the storage box occupies while it is not in use. The collapsible storage system may be mounted a diverse array of different trucks and other vehicles having tailgates and may be installed and uninstalled without the use of tools.

15 Claims, 32 Drawing Sheets

(56) References Cited

U.S. PATENT DOCUMENTS

| | | | | |
|---|---|---|---|---|
| 7,753,222 | B1* | 7/2010 | Heinrichs | B65D 21/0209 220/4.28 |
| 7,857,177 | B2* | 12/2010 | Reeves | B60R 9/10 224/403 |
| 8,342,347 | B2* | 1/2013 | Hay | B65D 11/1866 312/258 |
| 8,505,795 | B2* | 8/2013 | Dunn | B60R 11/00 224/567 |
| 8,701,950 | B2* | 4/2014 | Roach | B60P 7/0892 224/404 |
| 8,844,740 | B2* | 9/2014 | Nemoto | B65D 11/1853 220/666 |
| 9,238,520 | B2* | 1/2016 | Jeremiah | G07F 13/025 |
| 9,463,751 | B1* | 10/2016 | Grubenhoff | B60R 13/01 |
| 9,487,248 | B1* | 11/2016 | Buckhalt | B65D 88/22 |
| 9,637,294 | B2* | 5/2017 | Kinskey | B65D 11/18 |
| 10,625,687 | B1* | 4/2020 | Todd | B60R 9/065 |
| 10,889,250 | B2* | 1/2021 | Flajnik | B62D 33/0207 |
| 10,906,723 | B2* | 2/2021 | Guerdrum | B65D 45/20 |
| 10,988,308 | B2* | 4/2021 | Cavalcante | B65D 88/52 |
| 2002/0145022 | A1* | 10/2002 | Nguyen | B60R 7/02 224/539 |
| 2006/0266778 | A1* | 11/2006 | Allotey | B60R 9/00 224/403 |
| 2007/0278223 | A1* | 12/2007 | Ficker | B65D 11/184 220/6 |
| 2008/0296308 | A1* | 12/2008 | Barbalho | B65D 11/1833 220/666 |
| 2009/0255967 | A1* | 10/2009 | Lueder | B60R 9/00 224/404 |
| 2010/0264180 | A1* | 10/2010 | Allotey | B60R 11/06 224/404 |
| 2012/0193353 | A1* | 8/2012 | Cronin | A45C 5/03 29/434 |
| 2012/0261451 | A1* | 10/2012 | Roach | B60R 9/065 224/404 |
| 2016/0368656 | A1* | 12/2016 | Green | B65D 11/1826 |
| 2021/0053741 | A1* | 2/2021 | Barfoot | B65D 11/1833 |
| 2021/0086979 | A1* | 3/2021 | Guerdrum | B65D 81/3813 |
| 2021/0155166 | A1* | 5/2021 | Singer | B60R 9/065 |
| 2021/0316650 | A1* | 10/2021 | Ruvalcaba | B60N 3/102 |

* cited by examiner

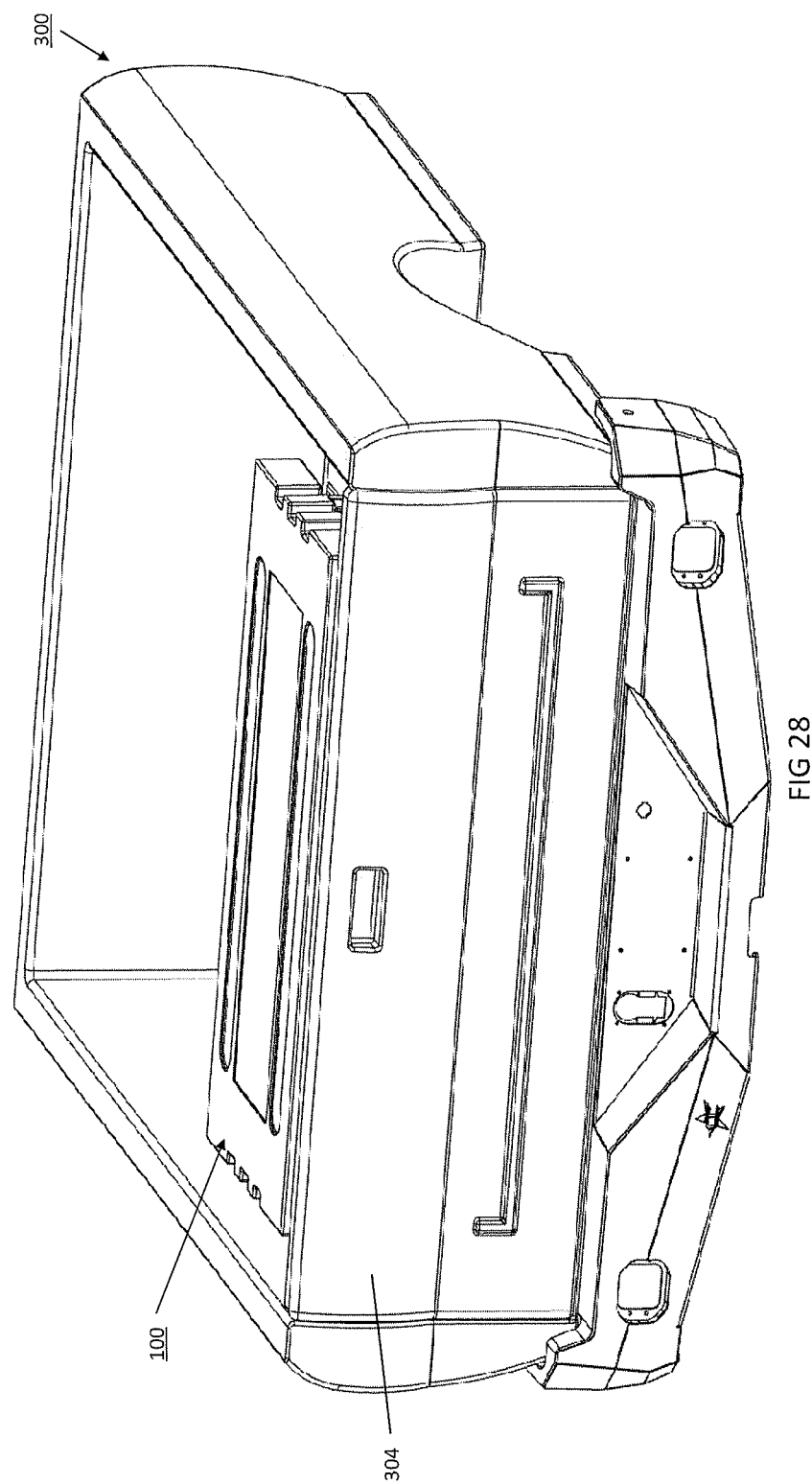

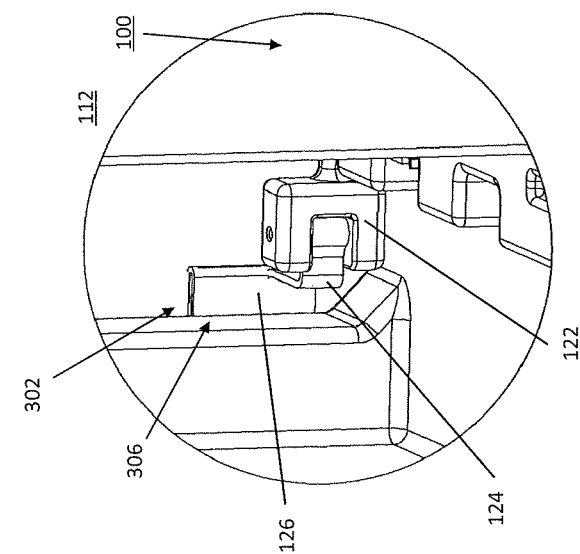
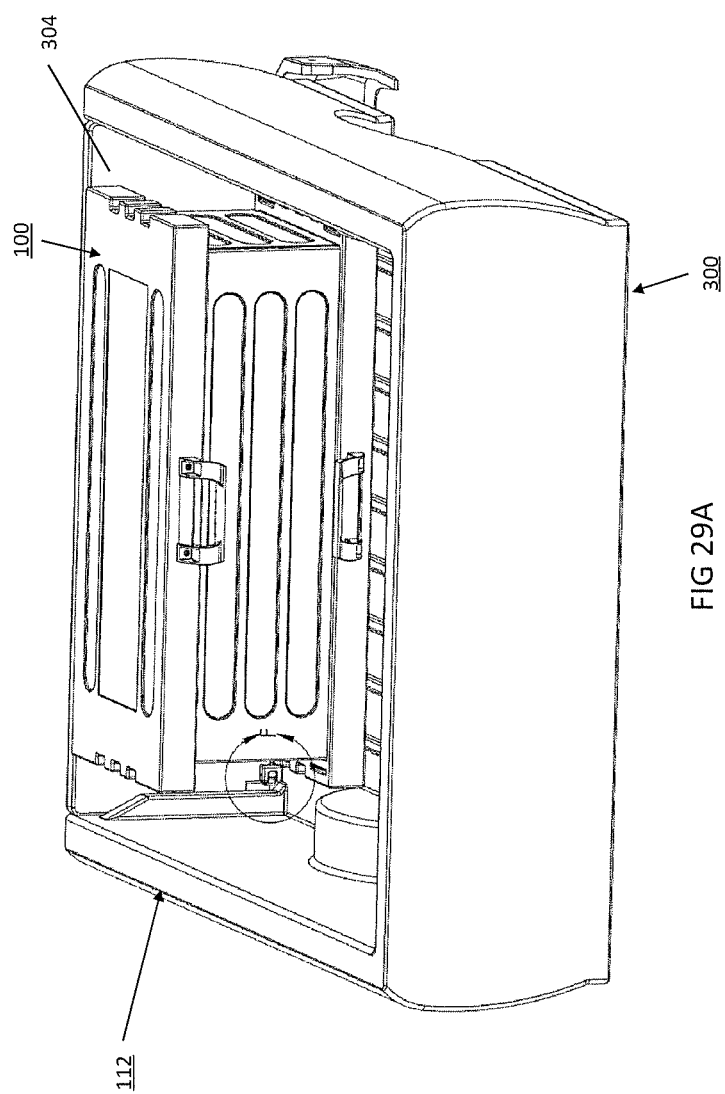

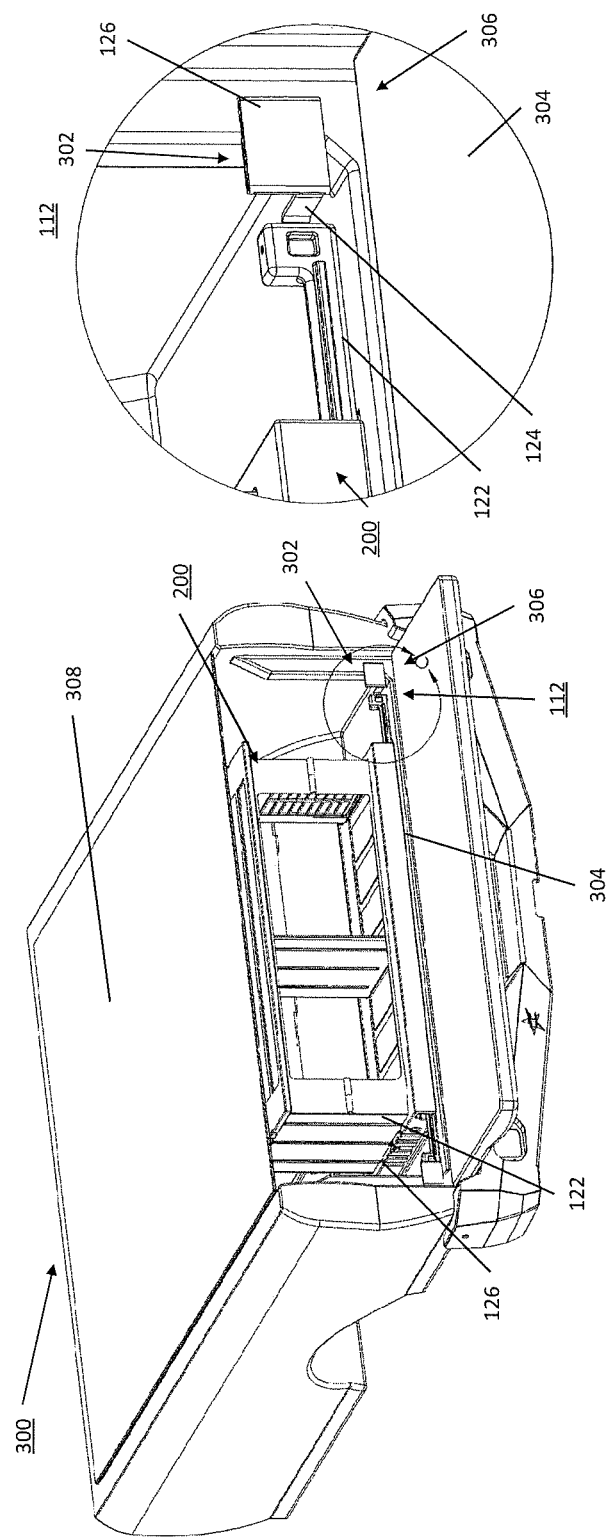

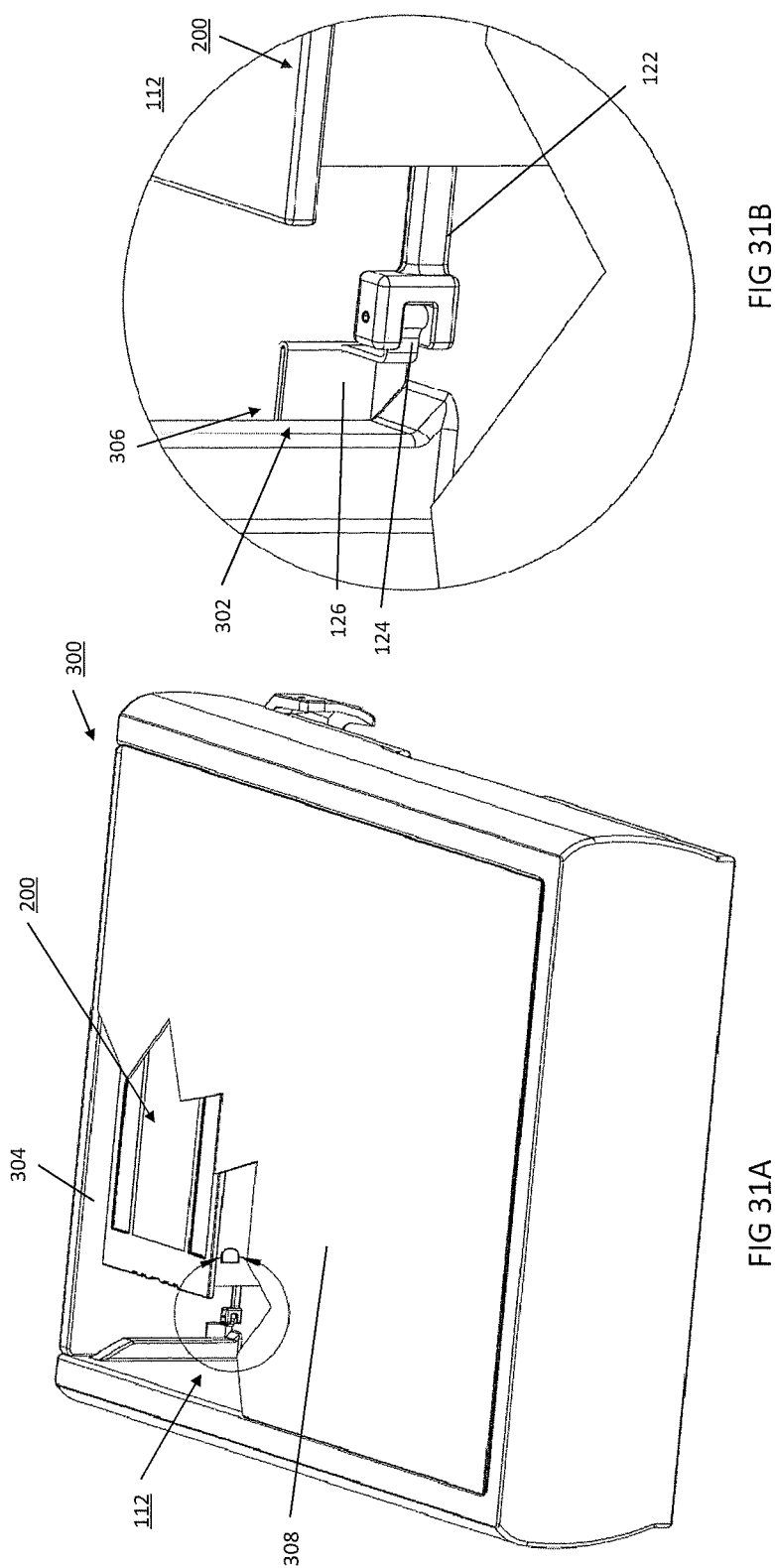

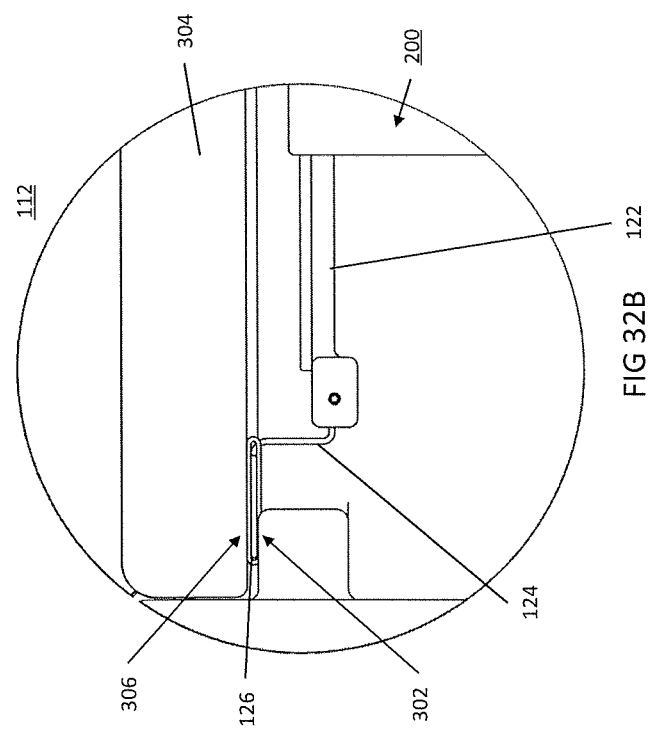
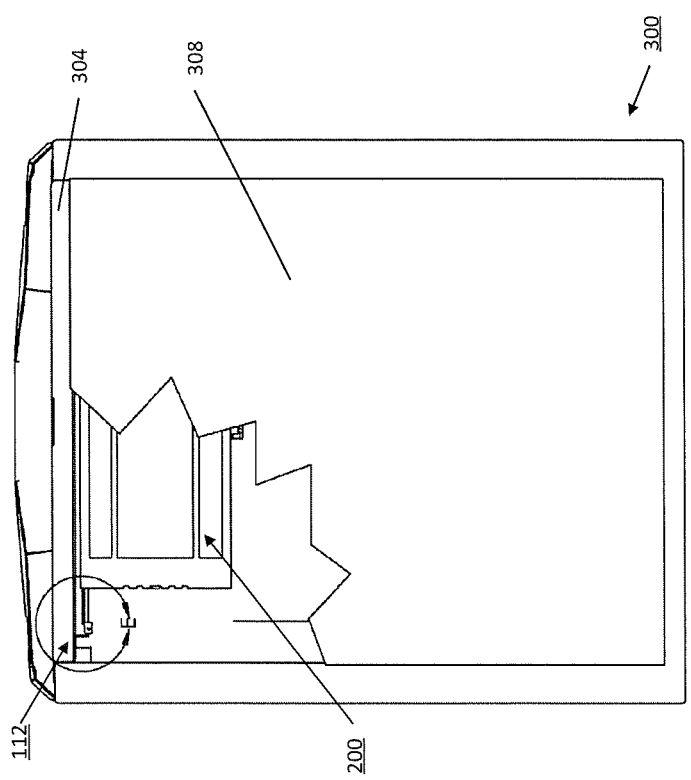

TAILGATE-MOUNTED COLLAPSIBLE STORAGE SYSTEM

CROSS-REFERENCE TO RELATED APPLICATIONS

This application claims priority under USC 35 119(e) to U.S. provisional patent application Ser. No. 63/069,624, entitled "A collapsible storage system that secures at the tailgate of a pickup truck", filed Aug. 24, 2020, the entirety of which is hereby incorporated by reference.

FIELD OF THE INVENTION

The present disclosure relates to storage systems for use with vehicles having tailgates. More specifically, the present disclosure teaches how to make and use a collapsible storage system that can be secured to the tailgate of a vehicle.

BACKGROUND OF THE INVENTION

Pickup truck owners have limited options when it comes to securely storing items in the bed of their truck in order to protect any such items from theft or inclement weather. Generally, the primary means for securely storing items in a truck's bed include the use of either a truck bed cover or a storage box that sits up against the cabin of the truck. Truck bed covers cover the entirety of a trucks bed and therefore do not allow for easy unsecured storage of items in the bed of the truck while the cover is in use. Additionally, truck bed covers place a literal ceiling on the volume that may be transported inside of a truck's bed during their use. Traditional truck storage boxes do allow for easy unsecured storage of items in a truck bed while providing for he secured storage of items within the storage box; however, their positioning proximate the truck's cabin and across the entire length of the truck's bed from the tailgate, results in it being difficult to easily access the contents securely stored inside of such traditional storage boxes. Furthermore, such traditional truck bed storage boxes are rigid containers that can take up a not insignificant portion of the storage volume provided by the bed of the truck whether or not there is anything being securely stored in the storge box.

Additionally, many truck bed covers and traditional truck storage boxes are designed so as to only be compatible with particular makes/models of trucks, or require tools to be installed or uninstalled.

Accordingly, there is the need for a secure storage system that allows for easy access to the contents securely stored inside of it while simultaneously permitting items to be stored in the truck's bed in an unsecured manner; which allows for the minimization of truck bed volume required by the secure storage system when it is not actively being used; which is agnostic as to the make/model of the truck in which it is to be used; and does not require the use of any tool(s) to install or uninstall.

While the present document may discus the use of the system herein in reference to "trucks" and "truck beds" it should be understood that the tailgate-mounted collapsible storage system taught herein may operate with any vehicle that has a tailgate and body having surfaces suitable for mounting using the interface surface discussed hereinbelow, and is not limited to be limited to use with trucks.

BRIEF SUMMARY OF THE INVENTION

The present disclosure relates to storage systems for use in vehicles having tailgates. More specifically, the present disclosure teaches how to make and use a collapsible storage system that can be secured to a tailgate.

The storage systems described herein provide advantages over relevant art by (i) providing a system that is agnostic as to the make or model of the truck into which it is being installed; (ii) does not require the use of any tool(s) to install or uninstall from the bed of a truck; (iii) is easily accessible due to its mounting location proximate the tailgate of the truck in which the system is installed; (iv) allows for access to the unsecured portion of a truck's bed while in use; and (v) may be collapsed in order to minimize the amount of the truck bed's storage space monopolized by the system when it is not in use.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

FIG. 28 depicts an embodiment of a tailgate-mounted collapsible storage system installed in the bed of a truck with the tailgate in its closed position.

FIG. 29A depicts an alternate view of an embodiment of a tailgate-mounted collapsible storage system installed in the bed of a truck with the tailgate in its closed position.

FIG. 29B depicts a zoomed-in view of the location where the mounting system interfaces with the vehicle and the tailgate to secure the tailgate-mounted collapsible storage system to the vehicle while the tailgate is in its closed position.

FIG. 30A depicts an alternate embodiment of a tailgate-mounted collapsible storage system set in the bed of a truck covered by a bedcover with the tailgate in its open position.

FIG. 30B a zoomed-in view of the location where the mounting system interfaces with the vehicle and the tailgate to secure the tailgate-mounted collapsible storage system to the vehicle while the tailgate is in its open position.

FIG. 31A depicts the bed of a truck with a bedcover with a cutout showing an embodiment of a tailgate-mounted collapsible storage system installed in the bed of a truck with the tailgate in its closed position.

FIG. 31B depicts a zoomed-in view of the location where the mounting system interfaces with the vehicle and the tailgate to secure the tailgate-mounted collapsible storage system to the vehicle while the tailgate is in its closed position.

FIG. 32A depicts a top view of the bed of a truck with a bedcover with a cutout showing an embodiment of a tailgate-mounted collapsible storage system installed in the bed of a truck with the tailgate in its closed position.

FIG. 32B depicts a zoomed-in view showing how an interface surface portion of a mounting system may be sandwiched between surfaces of the vehicle and the vehicle's tailgate when the tailgate is in its closed position in order to secure the mounting system to the vehicle.

DETAILED DESCRIPTION OF ILLUSTRATIVE EMBODIMENTS

Reference now should be made to the drawings, in which the same reference numbers are used throughout the different figures to designate the same components.

FIGS. 1-11 and 27-29B depict a first embodiment of a tailgate-mounted collapsible storage system in accordance with embodiments, namely tailgate-mounted collapsible storage system 100.

Figure 1:
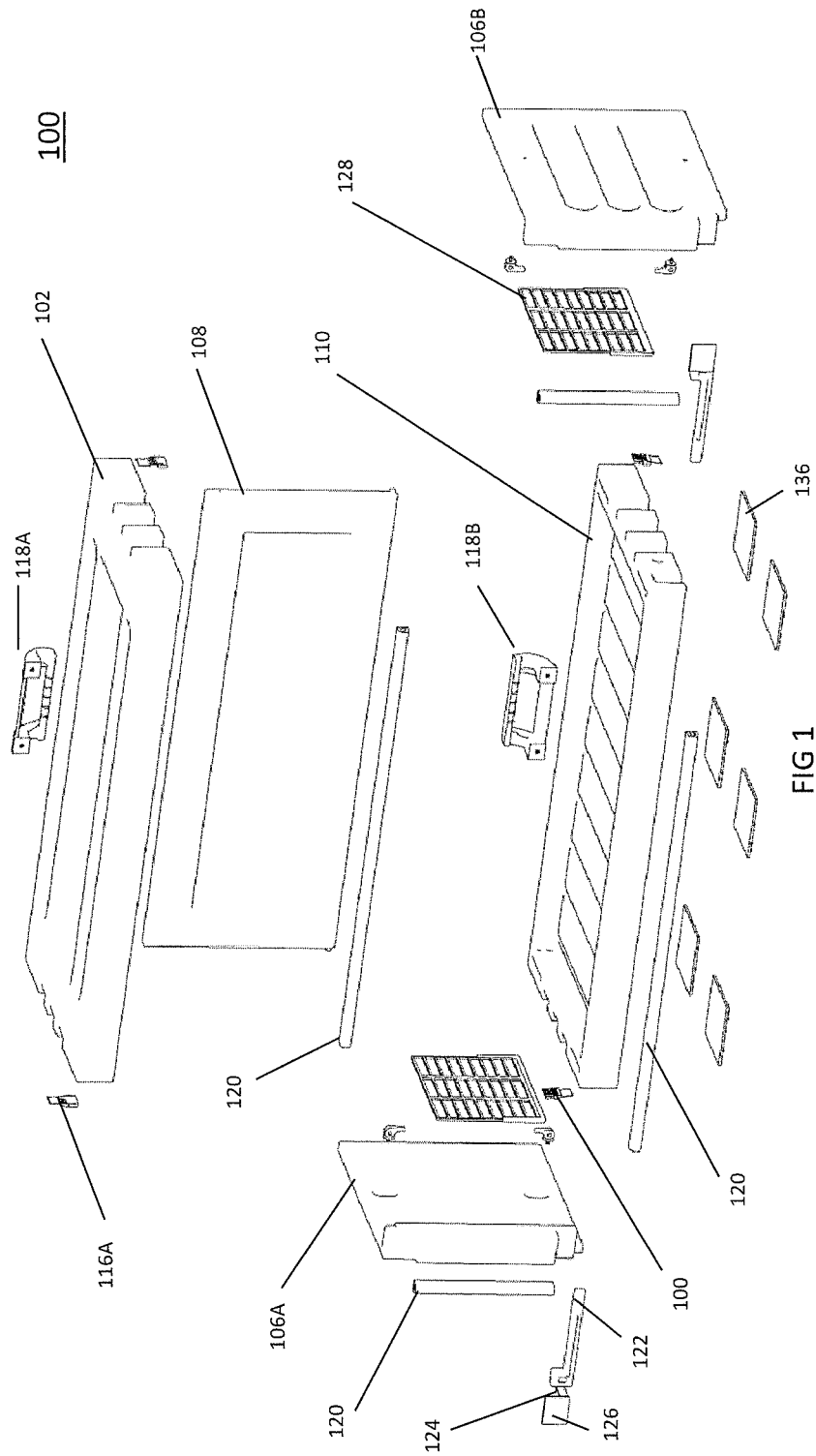
FIG. 1 depicts an exploded view of a first tailgate-mounted collapsible storage system in accordance with embodiments.

FIG. 1 provides an exploded view of the embodiment of a of a tailgate-mounted collapsible storage system 100 presented in FIGS. 1-11 and 27-29B. Tailgate-mounted collapsible storage system 100 may comprise top panel 102, side panels 106A and 106B, back panel 108, bottom panel 110, a plurality of hinges 114, a plurality of latches 116, handles 118, seals 120, mounting systems 112, and pouches 128.

A top edge of back panel 108 may be configured to mechanically engage with a back portion of top panel 102. A top edge of each side panel 106A and 106B may be configured to mechanically engage with a side portion of top panel 102 on each of its respective sides.

A bottom edge of back panel 108 may be configured to mechanically engage with a back portion of bottom panel 110. A bottom edge of each side panel 106A and 106B may be configured to mechanically engage with a side portion of bottom panel 110.

A first side portion of back panel 108 may be configured to mechanically engage with a back edge of a first side panel 106A, while a second side portion of back panel 108 may be configured to mechanically engage with a back edge of a second side panel 106B. Side panels 106A and 106B may be positioned opposite one another in a mirrored configuration.

To facilitate such mechanical engagement between the body panels of tailgate-mounted collapsible storage system 100 in embodiments the top panel 102 and/or bottom panel 110 may comprise one or more slots configured to receive and secure an edge portion of one or more of the lateral body panels (side panels, and front and back panels) recessed into their inner surface. Tailgate-mounted collapsible storage system 100 may use such slots, with the body panels of tailgate-mounted collapsible storage system 100 operating as tabs, to allow for tailgate-mounted collapsible storage system 100 to be configured into its expanded configuration through slot-and-tab assembly.

In embodiments, when tailgate-mounted collapsible storage system 100 is in its expanded configuration, portions of top panel 102, bottom panel 110, and side panels 106A and 106B may be arranged such that there is an aperture formed therebetween that allows for access into the interior volume of tailgate-mounted collapsible storage system 100 defined by its constituent body panels (top panel 102, side panels 106A and 106B, back panel 108, and bottom panel 110). To reduce the exposure of the interior volume of tailgate-mounted collapsible storage system 100 to the elements, embodiments of tailgate-mounted collapsible storage system 100 may comprise one or more seals 120 attached around the edges of the aperture formed by top panel 102, bottom panel 110, and side panels 106A and 106B. Tailgate-mounted collapsible storage system 100 may be positioned such that when the tailgate of the vehicle into which collapsible storage system 100 is mounted is closed the inner surface of the tailgate interfaces with seals 120 in order to form a seal between the inner surface of the closed tailgate and the panels that form the aperture in tailgate-mounted collapsible storage system 100.

In embodiments, one or more of the edges of one or more of collapsible storage system 100 body panels (top panel 102, side panels 106A and 106B, back panel 108, and bottom panel 110) may comprise one or more tabs designed to interlock with associated tabs from an adjacent body panel, or slots cast into the adjacent body panel, to provide for additional structural rigidity and stability of collapsible storage system 100 while it is in its expanded configuration.

Tailgate-mounted collapsible storage system 100 100 may additionally comprise one or more mounting systems 112. Mounting system 112 may comprise an arm 122, a security hinge 124, and a interface surface 126. A proximal end of arm 122 may be mechanically affixed to bottom panel 110. Security hinge 124 may be attached to the distal end of arm 122 and may extend between said distal end of arm 122 and interface surface 126. Interface surface 126 may be used to form a mechanical friction fit between collapsible storage system 100 and the bed of a truck.

Embodiments of collapsible storage system 100 may comprise a handle 118 mechanically affixed to and extending from an external surface of a front portion of a lip formed by top panel 102, and a handle 118 mechanically affixed to and extending from an external surface of a front portion of a lip formed by bottom panel 110. In such embodiments, each of the handles 118 may be a half-handle, which may be positioned and configured such that they meet to form a single handle when collapsible storage system 100 is in a collapsed configuration.

Embodiments of collapsible storage system 100 may comprise one or more latches 116 for securing top panel 102 to bottom panel 110 when collapsible storage system 100 is in a collapsed configuration. For example, collapsible storage system 100 may comprise one or more latches 116, wherein a portion of latch 116 is located on an exterior surface of a lip formed by each of top panel 102 and bottom panel 110 such that the two portions of latch 116 are aligned vertically with one another such that they may be disengagably engaged together when the system 100 is collapsed.

Embodiments of collapsible storage system 100 may comprise any number of seals, such as seal 120, as may be required to make collapsible storage system 100 suitably weather resistant. Seals may be positioned at locations such as the junction between the various body panels of collapsible storage system 100 (i.e., top panel 102, side panels 106A and 106B, back panel 108, and bottom panel 110).

Embodiments of collapsible storage system 100 may comprise one or more pouches, which may be mounted to an interior surface of one or more of the side panels 106A and 106B.

Figure 2:
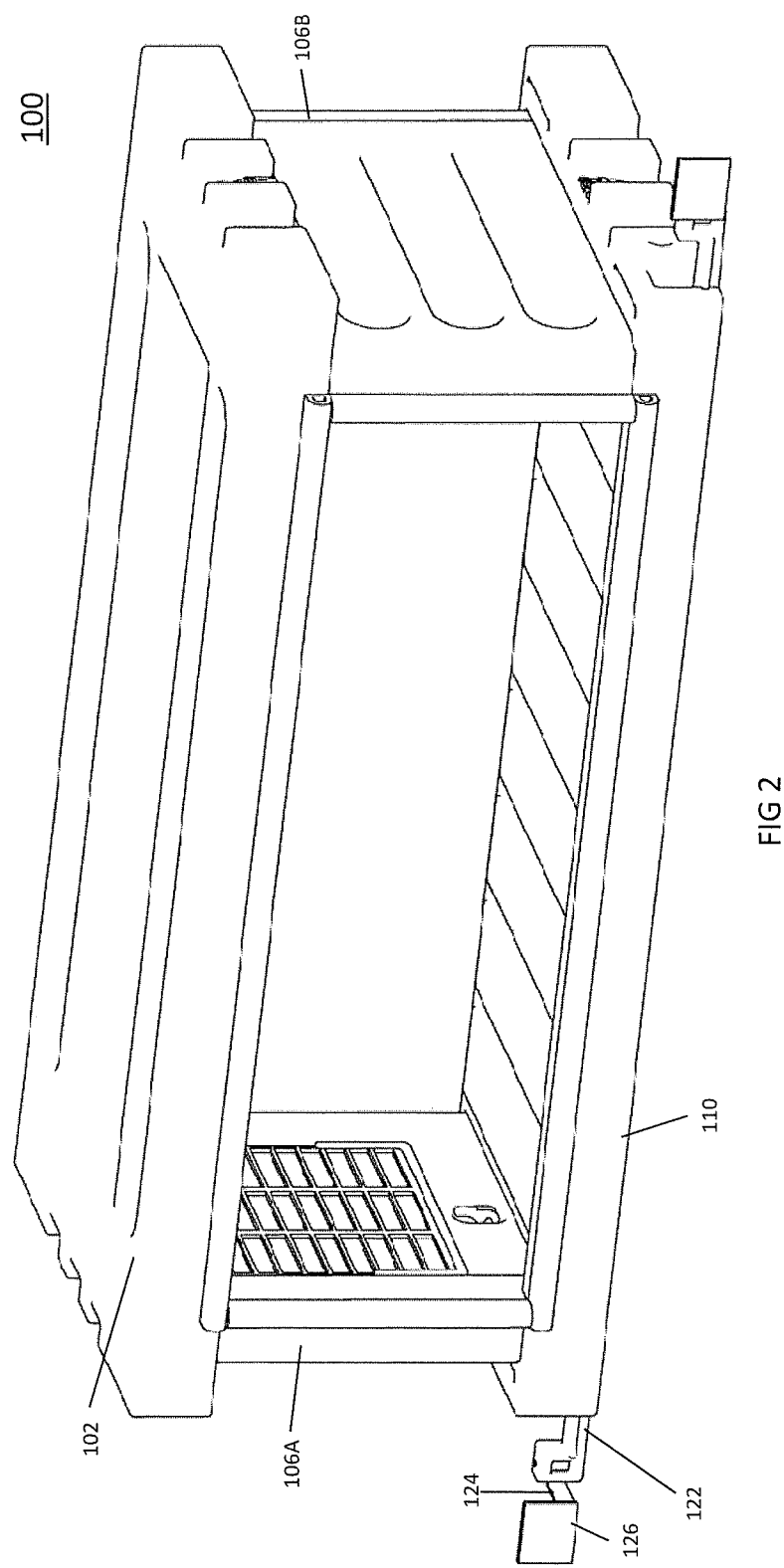
FIG. 2 depicts a front-perspective view of a tailgate-mounted collapsible storage system while in its expanded configuration, in accordance with embodiments.

FIG. 2 provides a front-perspective view of tailgate-mounted collapsible storage system 100 while in its expanded configuration.

Figure 3:
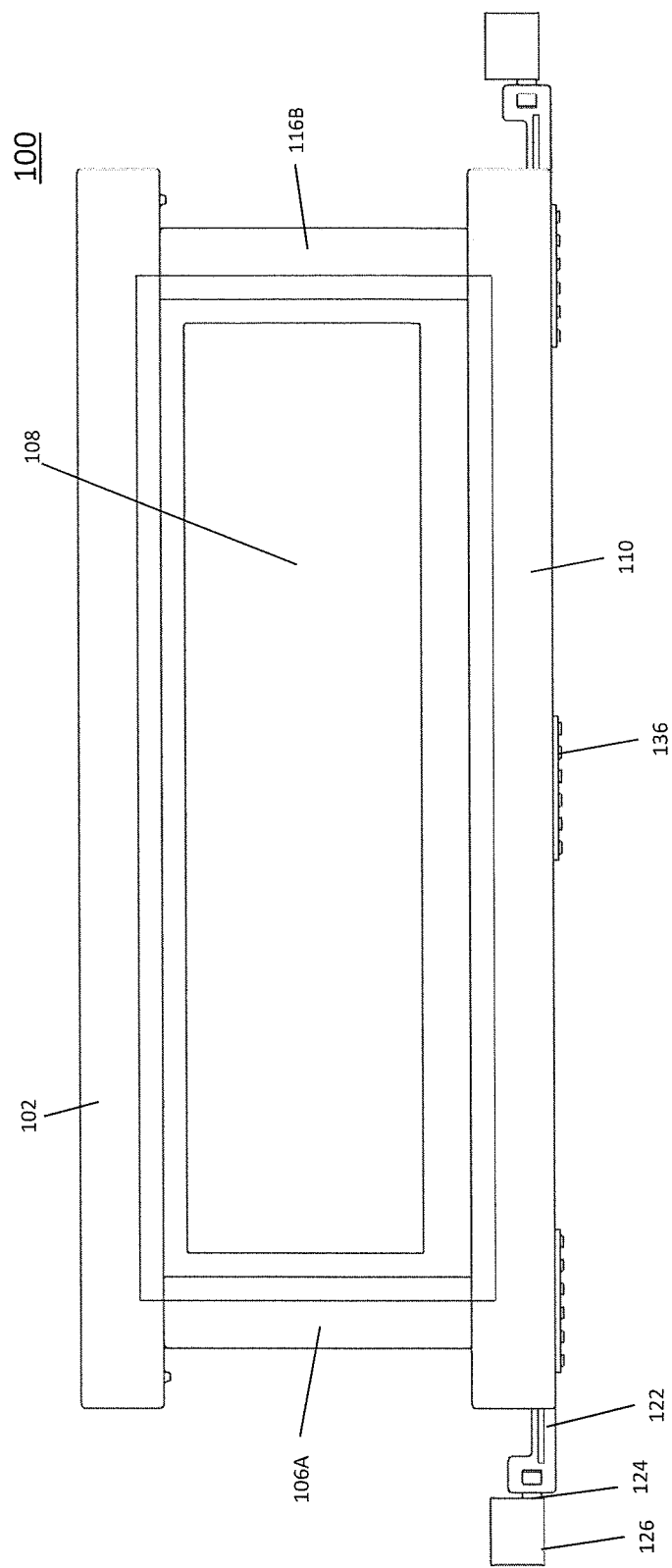
FIG. 3 depicts a front view of a tailgate-mounted collapsible storage system while in its expanded configuration, in accordance with embodiments.

FIG. 3 provides a front view of tailgate-mounted collapsible storage system 100 while in its expanded configuration.

Figure 4:
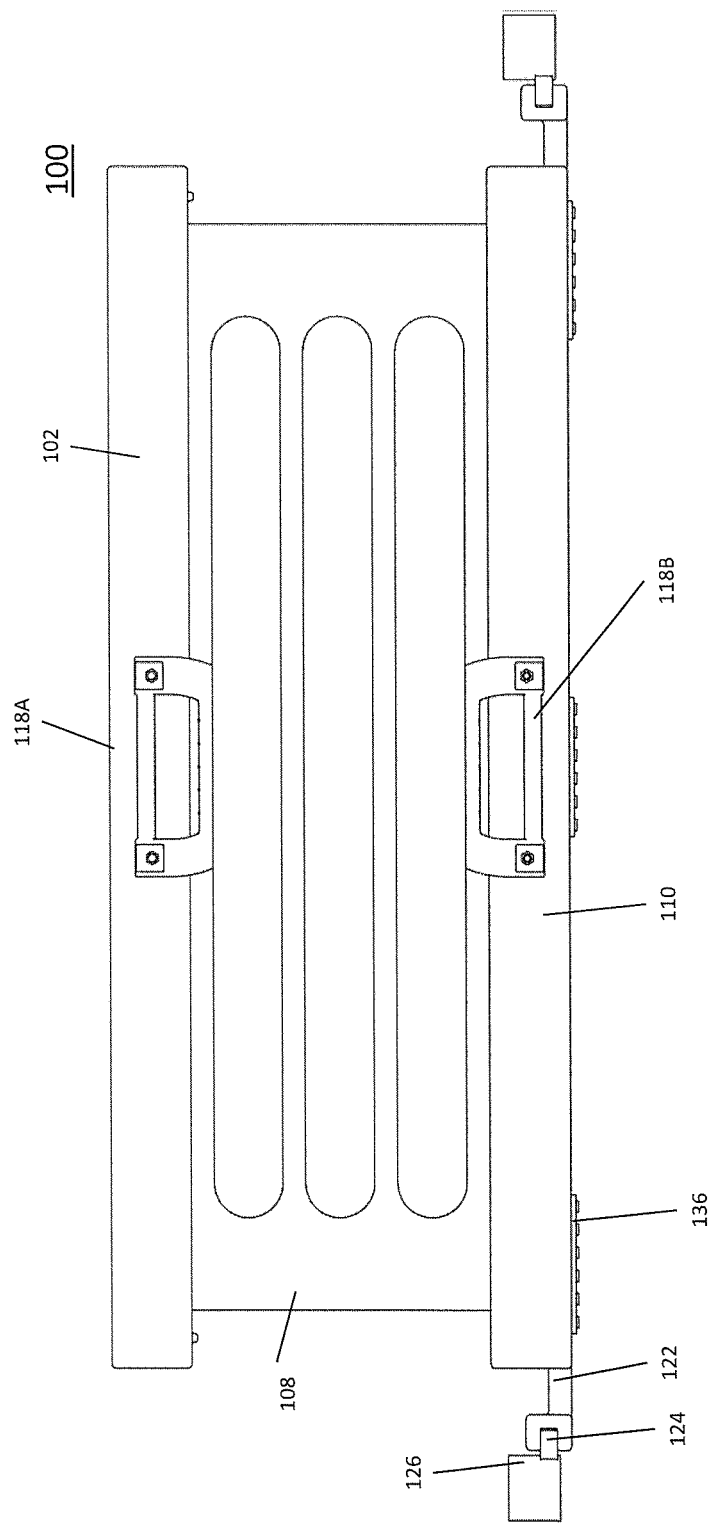
FIG. 4 depicts a back view of a tailgate-mounted collapsible storage system while in its expanded configuration, in accordance with embodiments.

FIG. 4 provides a back view of tailgate-mounted collapsible storage system 100 while in its expanded configuration.

Figure 5:
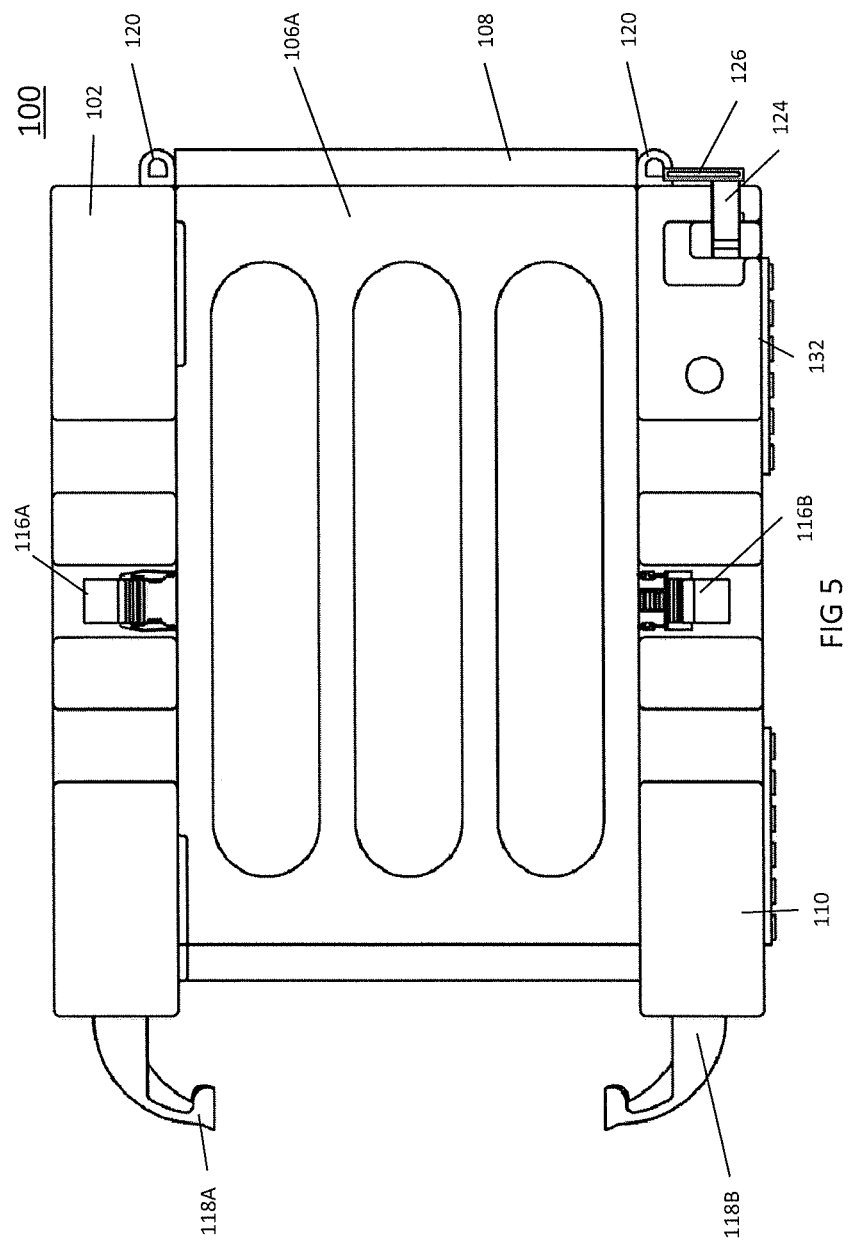
FIG. 5 depicts a right-side view of a tailgate-mounted collapsible storage system while in its expanded configuration, in accordance with embodiments.

FIG. 5 provides a right-side view of tailgate-mounted collapsible storage system 100 while in its expanded configuration. Side panel 106A can be seen extending between top panel 102 and bottom panel 110. One or both of top panel 102 and bottom panel 110 may comprise a lip, such as lip 111, which may be formed about the edge of the panel. One or more of the mounting systems 112, the latch 116 and the handle 118 may be attached to a lip portion of the top panel 102 and the bottom panel 110. Mounting system 112 can be seen extending from a lip portion of bottom panel 110.

As seen in FIG. 5, latch 116 may comprise a top latch portion 116A, which may be attached to a lip portion of top panel 102; and a bottom latch portion 116B, which may be attached to a lip portion of bottom panel 110. Top latch portion 116A and bottom latch portion 116B may be positioned such that they become aligned and abut one another when tailgate-mounted collapsible storage system 100 is in its collapsed configuration. When top latch portion 116A and bottom latch portion 116B are aligned and abutting they form latch 116, which may be used to secure affix top panel 102 to bottom panel 110 while the system 100 is in its collapsed configuration. In embodiments, latch 116 may be located on one or both sides of system 110 having side panels 106.

Similarly, as seen in FIG. 5, handle 118 may comprise a top half-handle 118A and a bottom half-handle 118B, which may each be affixed to the respective lips of the respective top and bottom panels (102, 110). Top half-handle 118A and bottom half-handle 118B may be positioned such that they become aligned and abut one another when tailgate-mounted collapsible storage system 100 is in its collapsed configuration. When Top half-handle 118A and bottom half-handle 118B are aligned and abutting they form handle 118, which may be used to easily transport the tailgate-mounted collapsible storage system 100 by hand when necessary or desirable. Additionally, embodiments of tailgate-mounted collapsible storage systems which use a paired set of half-handles, such as system 100, provide added benefit by ensuring that the system does not expand from its collapsed configuration to its expanded configuration during manual transport. This is because, in such embodiments, the act gripping grip 118 will help hold the top panel 102 next to bottom panel 110 and thereby keep the system in its collapsed configuration.

In embodiments, handle 118, or portions thereof may be affixed to any suitable body panel(s) to allow for easy manual transport of tailgate-mounted collapsible storage system 100 while it is in its collapsed configuration.

Figure 6:
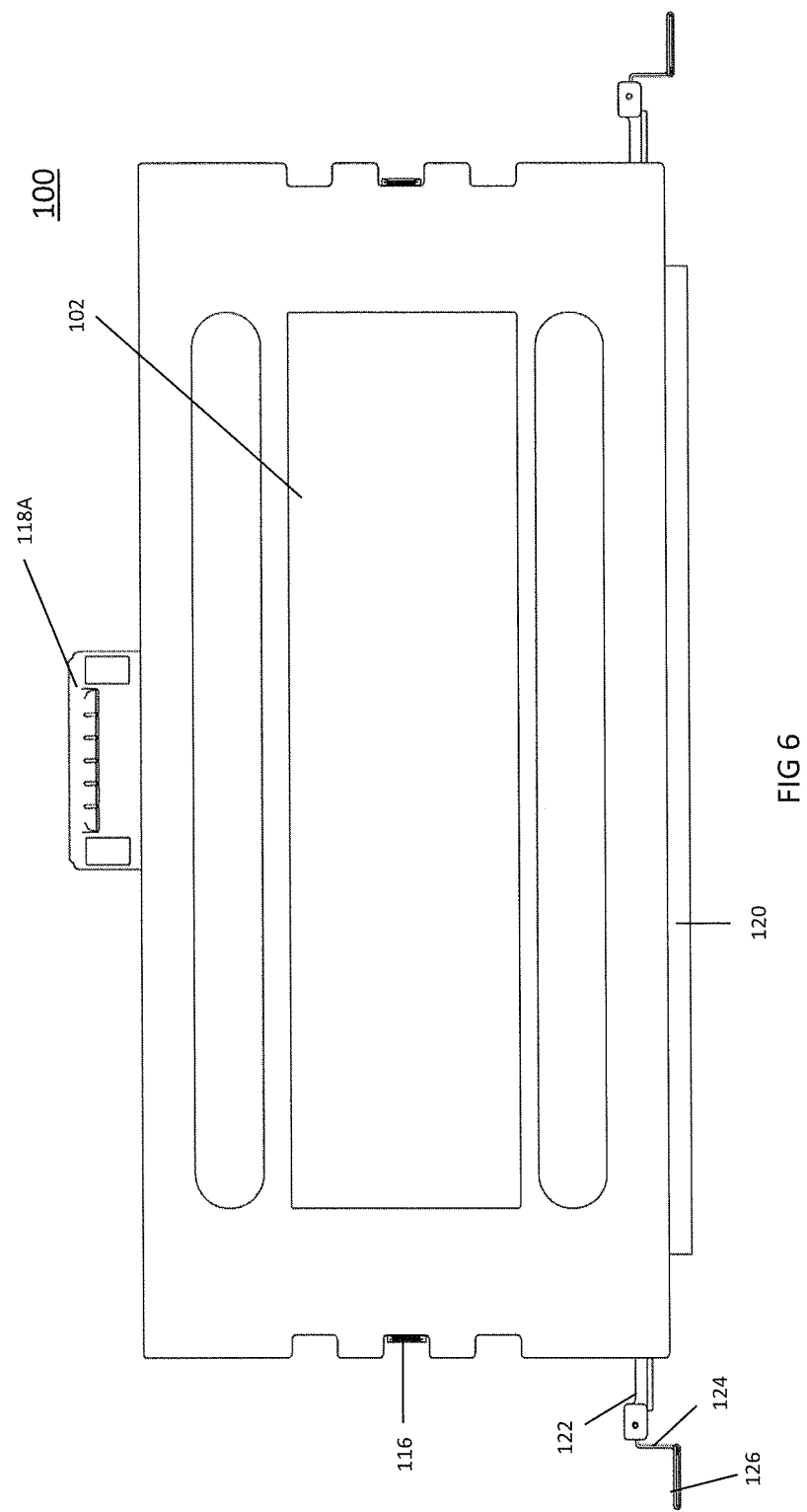
FIG. 6 depicts a top view of a tailgate-mounted collapsible storage system in accordance with embodiments.

FIG. 6 provides a top view of tailgate-mounted collapsible storage system 100.

Figure 7:
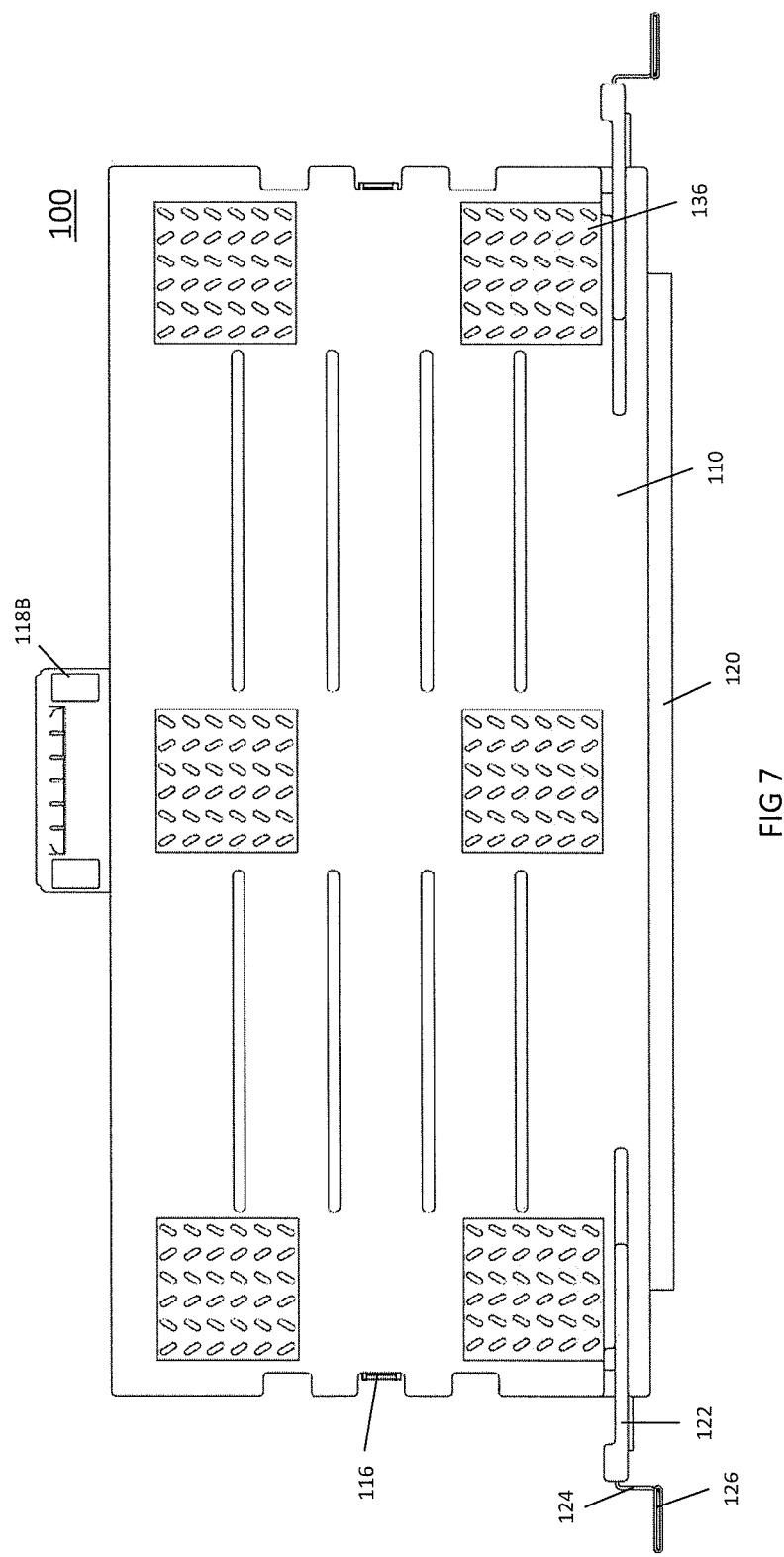
FIG. 7 depicts a bottom view of a tailgate-mounted collapsible storage system in accordance with embodiments.

FIG. 7 provides a bottom view of tailgate-mounted collapsible storage system 100. Bottom panel 110 may have one or more pads 136 affixed to its bottom surface in order to pad the interface between tailgate-mounted collapsible storage system 100 and the truck bed into which it may be installed.

Pads, like pad 136, may help to reduce any wear-and-tear that may occur due to physical interaction between the system and the vehicle to which the system may be mounted. They may also assist with the dampening of any sound or other undesirable vibrations generated by the collapsible storage system and or its interaction with a vehicle.

One or more mounting systems 112 may be connected to base plate 110 and extend laterally therefrom.

Figure 8:
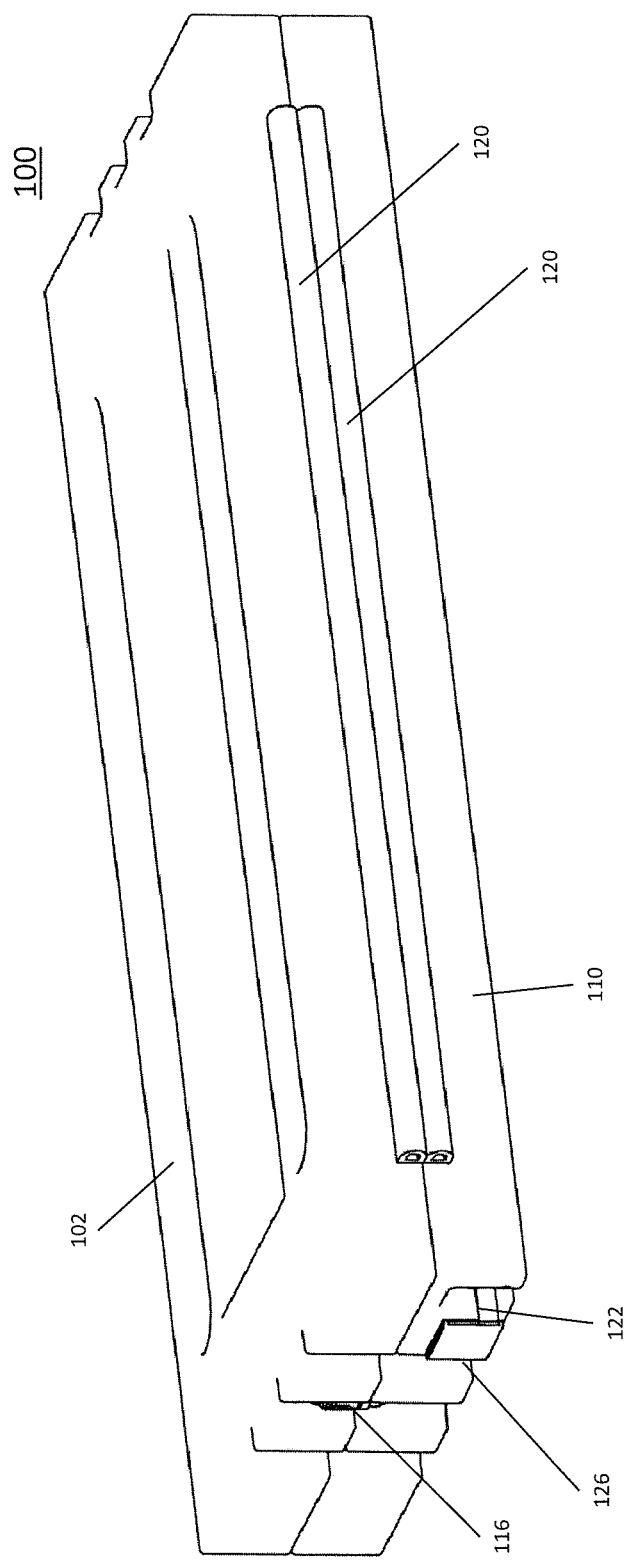
FIG. 8 depicts a front-perspective view of a tailgate-mounted collapsible storage system while in its collapsed configuration, in accordance with embodiments.

FIG. 8 provides a front-perspective view of tailgate-mounted collapsible storage system 100 when it is in its collapsed configuration. As can be seen in this figure when the system 100 is in the collapsed configuration top panel 102 and bottom panel 110 abut each other. Additionally, top half-handle 118A and bottom half-handle 118B can be seen aligning with and abutting one another to form handle 118. Mounting systems 112 can still be seen extending from each lateral side of bottom plate 110 while the system 100 is in its collapsed configuration.

Figure 9:
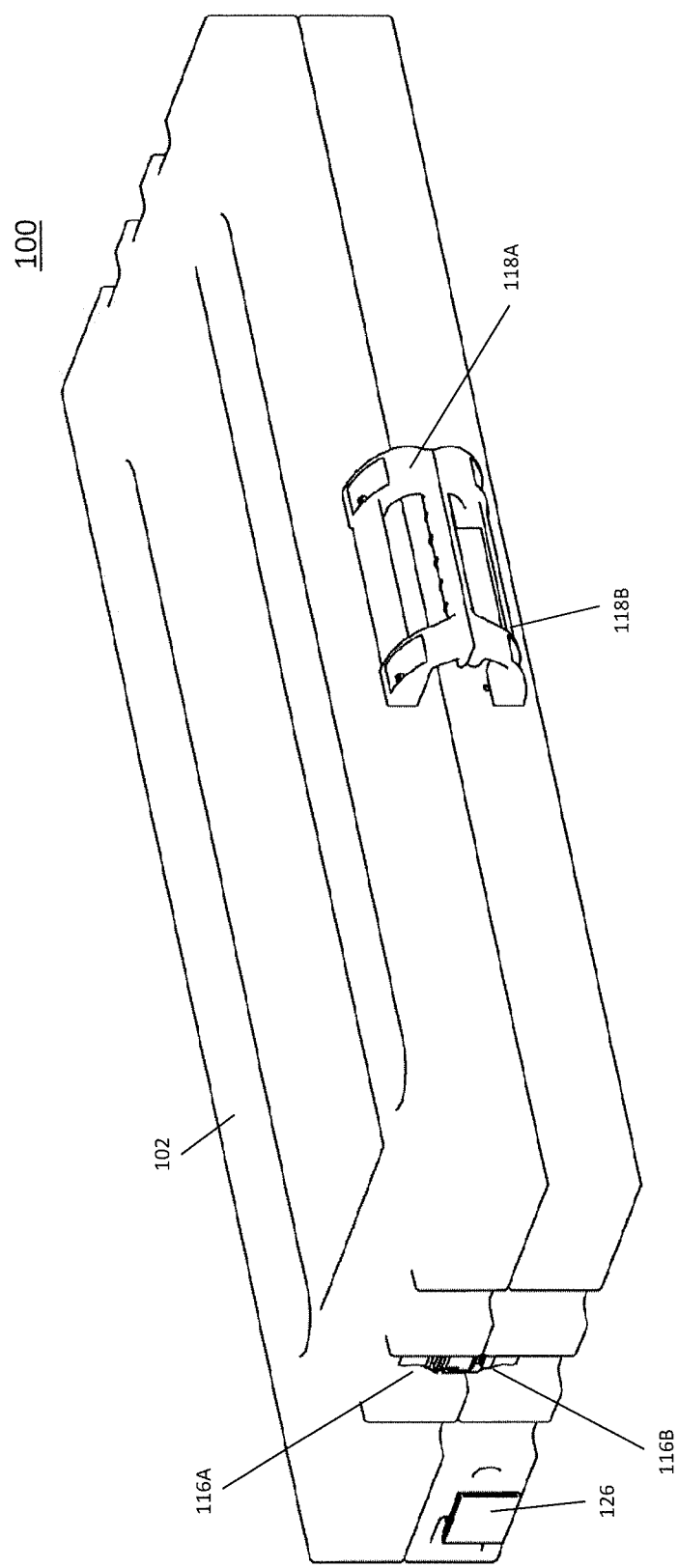
FIG. 9 depicts a back-perspective view of a tailgate-mounted collapsible storage system while in its collapsed configuration, in accordance with embodiments.

FIG. 9 provides a back-perspective view of tailgate-mounted collapsible storage system 100 when it is in its collapsed configuration.

Figure 10:
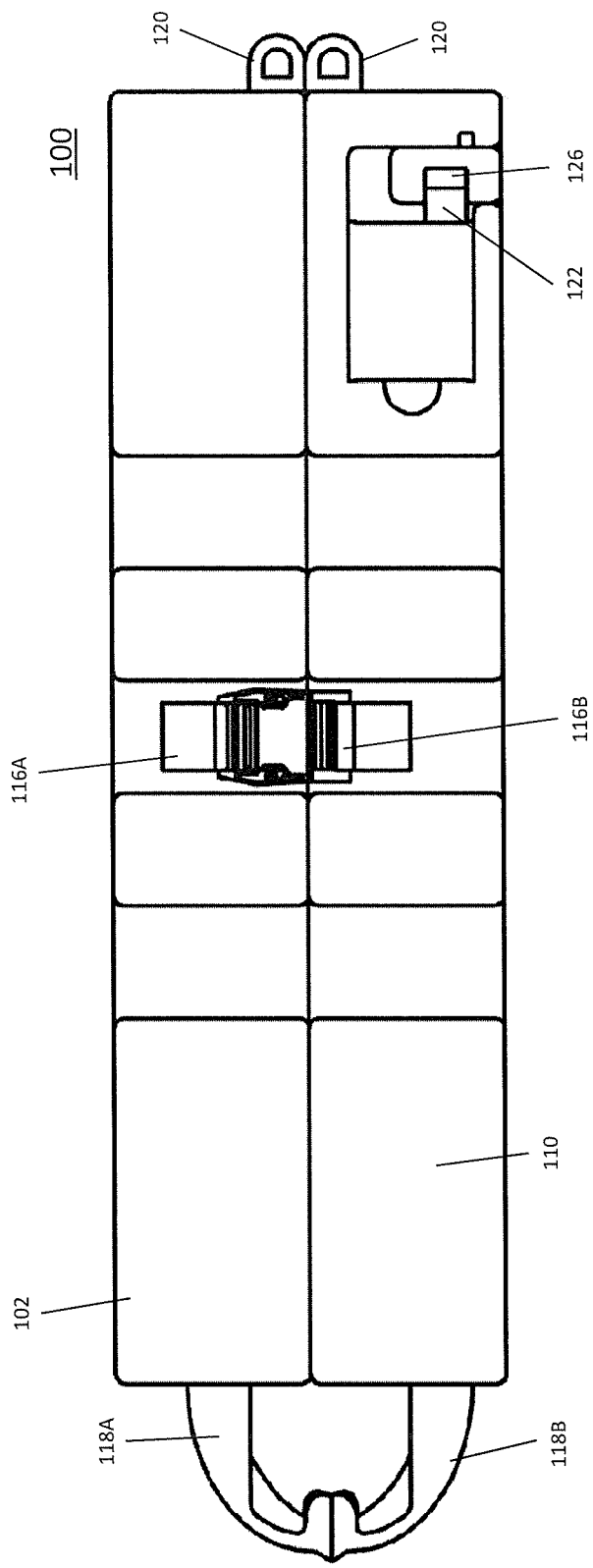
FIG. 10 depicts a right-side view of a tailgate-mounted collapsible storage system while in its collapsed configuration, in accordance with embodiments.

FIG. 10 provides a right-side view of tailgate-mounted collapsible storage system 100 while in its collapsed configuration.

Figure 11:
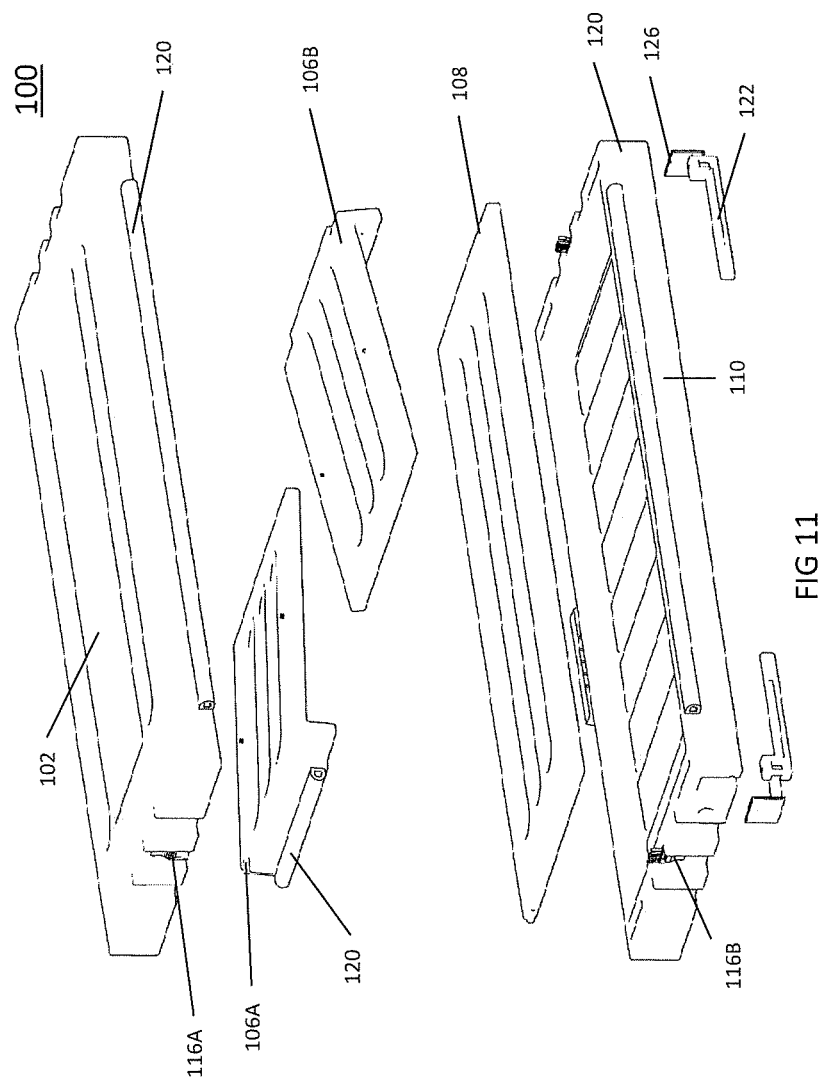
FIG. 11 depicts an exploded view of a tailgate-mounted collapsible storage system with its parts shown stacked in a manner designed to illustrate the way in which the panels may be separated and arranged to enable reconfiguration of the system into its collapsed configuration, in accordance with embodiments.

FIG. 11 provides an exploded view of tailgate-mounted collapsible storage system 100 with its constituent parts shown stacked in a manner designed to illustrate the way in which the panels may be separated and arranged to enable reconfiguration of the system into its collapsed configuration. More specifically, as can be viewed in FIG. 11, tailgate-mounted collapsible storage system 100 may be transitioned from its expanded configuration as depicted in FIG. 2 to its collapsed configuration as depicted in FIG. 8 by first removing its lateral body panels, namely side panels 106A and 106B and back panel 108, from their slot-and-tab interfacing with top panel 102 and bottom panel 110. Once the lateral body panels have been separated from the top panel 102, the bottom panel 110, and each other, they may be stacked flat on top of each other in between top panel 102 and bottom panel 110. In the embodiment depicted in FIG. 11, back panel 108 may be laid down on the inner surface of bottom panel 110, and then side panels 106A and 106B may then be laid flat on top of back panel 108. Finally, top panel 102 may be set atop bottom panel 110 such that the lateral body panels are enclosed thereby. Latch portions 116A and 116B may then be used to secure top panel 102 to bottom panel 110 for manual transport and/or storage.

FIGS. 12-23 and 30A-32B depict an alternate embodiment of a tailgate-mounted collapsible storage system in accordance with embodiments, namely tailgate-mounted collapsible storage system 200.

Figure 12:
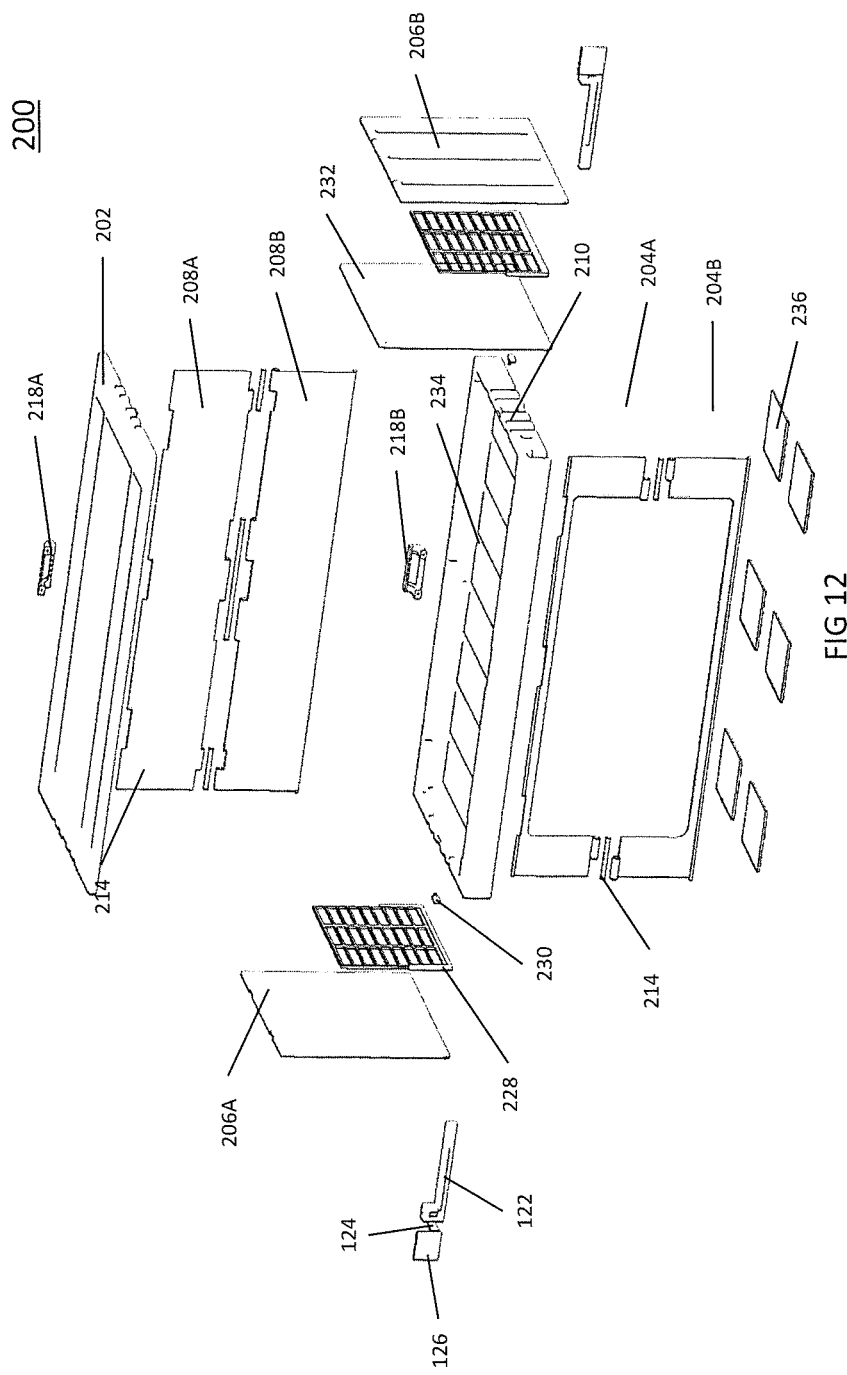
FIG. 12 depicts an exploded view of an alternate tailgate-mounted collapsible storage system in accordance with embodiments.

FIG. 12 provides an exploded view of the embodiment of a of a tailgate-mounted collapsible storage system 200 presented in FIGS. 12-23 and 30A-32B. Tailgate-mounted collapsible storage system 200 may comprise top panel 202, front panel 204, side panels 206A and 206B, back panel 208, bottom panel 210, divider panel 232, release 230, handle 218, and a plurality of hinges 214, seals 220, mounting systems 112, and pouches 228.

The configuration of tailgate-mounted collapsible storage system 200 is like that of tailgate-mounted collapsible storage system 100 with a few modifications. For example, tailgate-mounted collapsible storage system 200 additionally comprises front panel 204. Front panel 204 may comprise upper front panel 204A and lower front panel 204B, which may be foldably connected via a hinge 214. similarly, back panel 208 of tailgate-mounted collapsible storage system 200 may comprise upper back panel 208A and lower back panel 208B, which may be foldably connected via a hinge 214. By including a hinged seam in each of front panel 204 and back panel 208 tailgate-mounted collapsible storage system 200 may be capable of reducing to an even smaller volume than tailgate-mounted collapsible storage system 100 when in its collapsed configuration and may do so while remaining connected as a single piece instead of being separated into multiple discrete pieces as is necessary for the collapse of tailgate-mounted collapsible storage system 100.

One or more releases 230 may be included in tailgate-mounted collapsible storage system 200. Release 230 may be mounted into a portion of either top panel 202 or bottom panel 210 and may be configured such that actuation of release 230 may enable the transition of tailgate-mounted collapsible storage system 200 from its collapsed configuration into its expanded configuration. In embodiments, release 230 may be a portion of a latch, similar to latch 116, wherein a portion of the latch is affixed to top panel 202 and a portion of the latch is affixed to bottom panel 210. In such embodiments, actuation of release 230 may disengage the latch coupling top panel 202 to bottom panel 210 and thereby release the connection therebetween to allow for reconfiguration of tailgate-mounted collapsible storage system 200 into its expanded configuration.

Figure 13:
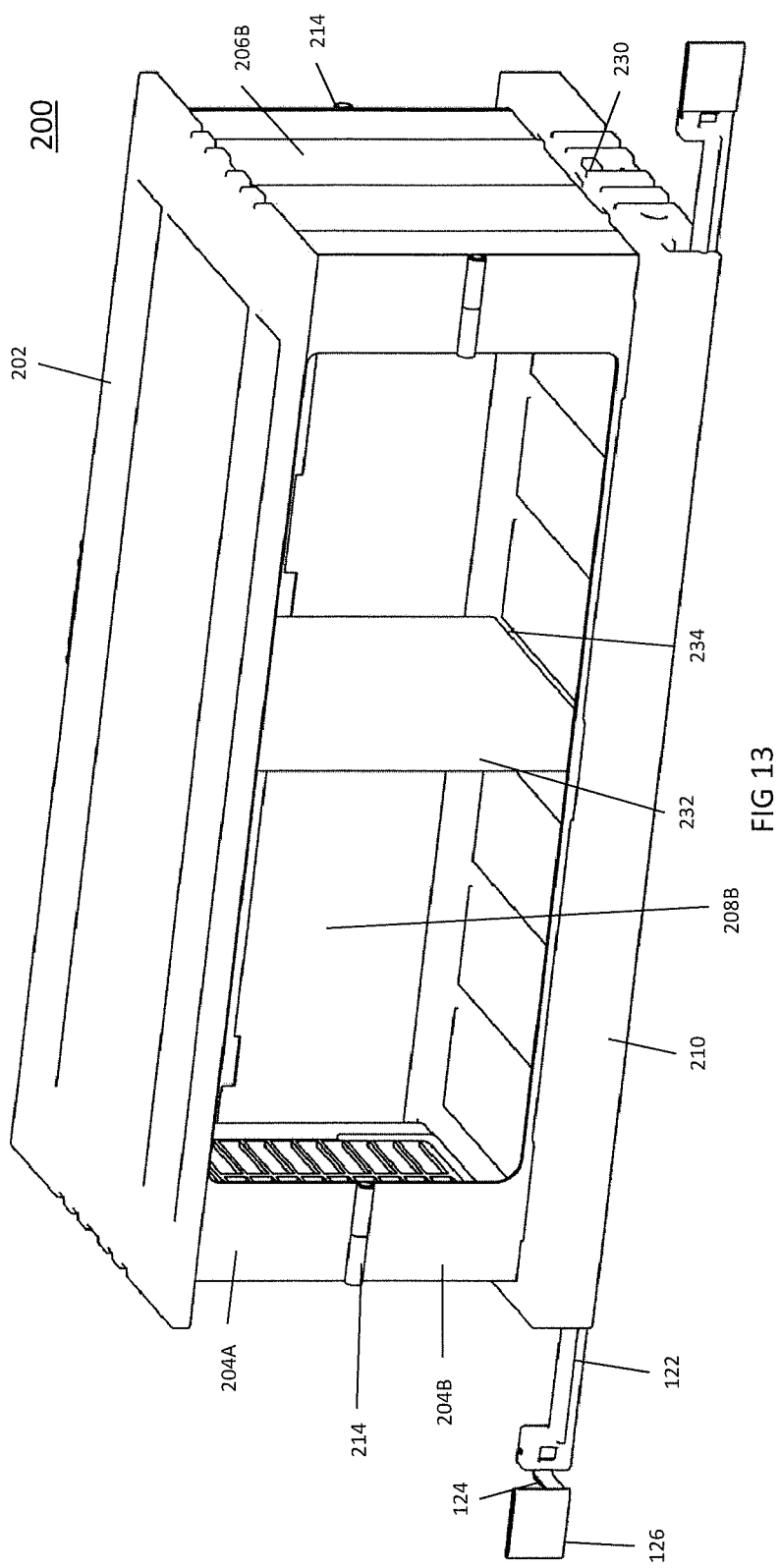
FIG. 13 depicts a front-perspective view of the alternate tailgate-mounted collapsible storage system while in its expanded configuration, in accordance with embodiments.

FIG. 13 provides a front-perspective view of tailgate-mounted collapsible storage system 200 while in its expanded configuration. From the view provided, one can see that embodiment of tailgate-mounted collapsible storage systems, including tailgate-mounted collapsible storage system 200, may comprise one or more divider panel(s) 232. In such embodiments, one or more of top panel 202, front panel 204, back panel 208, and/or bottom panel 210 may comprise one or more slot(s) 234 formed into an interior surface thereof (similar to the one or more slots from collapsible storage system 100, which may provide for slot-and-tab assembly of the system 100). Slot 234 may be configured to receive and mechanically retain a portion of divider panel 232. Therefore, when tailgate-mounted collapsible storage system 200 is in its expanded configuration a user may removably insert a portion of divider panel 232 with slot 234 and in order to create separately divided areas within the interior volume of tailgate-mounted collapsible storage system 200. The relative size of such areas formed by use of a divider panel 232 may vary depending on the particular location of slot 234 into which divider panel 232 is placed.

Figure 14:
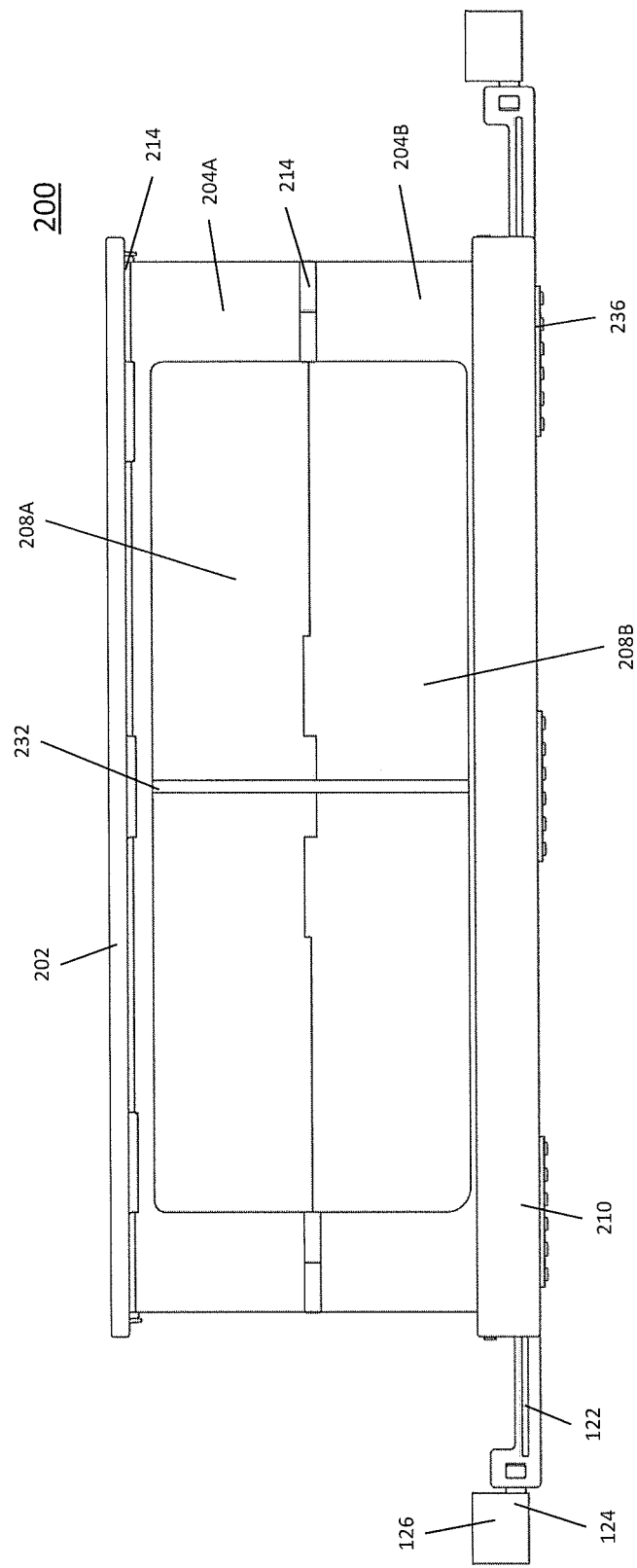
FIG. 14 depicts a front view of the alternate tailgate-mounted collapsible storage system while in its expanded configuration, in accordance with embodiments.

FIG. 14 provides a front view of tailgate-mounted collapsible storage system 200 while in its expanded configuration.

Figure 15:
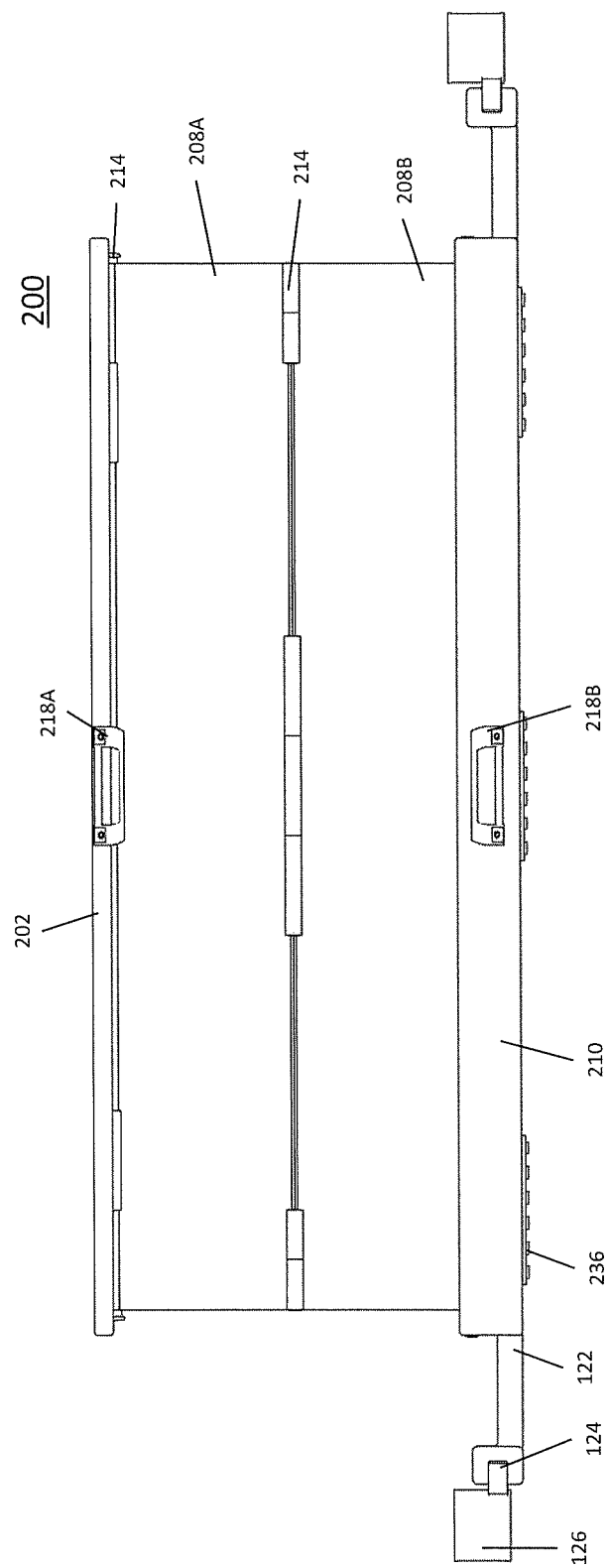
FIG. 15 depicts a back view of the alternate tailgate-mounted collapsible storage system while in its expanded configuration, in accordance with embodiments.

FIG. 15 provides a back view of tailgate-mounted collapsible storage system 200 in its expanded configuration. Upper back panel 108A and lower back panel 208B can be seen aligned vertically along hinge 214 to form back panel 208. Top panel 202 shows much less lip than its counterpart from tailgate-mounted collapsible storage system 100. In system 200, hinge 214A can be seen foldably connecting upper back panel 208A to top panel 202. On the side opposite of its connection to top panel 202, upper back panel 208A is foldably connected to lower back panel 208B by hinge 214B. On the side opposite of its connection to upper back panel 208A, lower back panel 208B is foldably connected to bottom panel 210 by a hinge, but in FIG. 15 that connection point is occluded by the lip 211 portion of bottom panel 210. A plurality of pads 236 can be seen extending from the bottom surface of bottom plate 210. Mounting systems 212 can be seen extending by their respective arms 122 from opposing sides of bottom plate 210.

Figure 16:
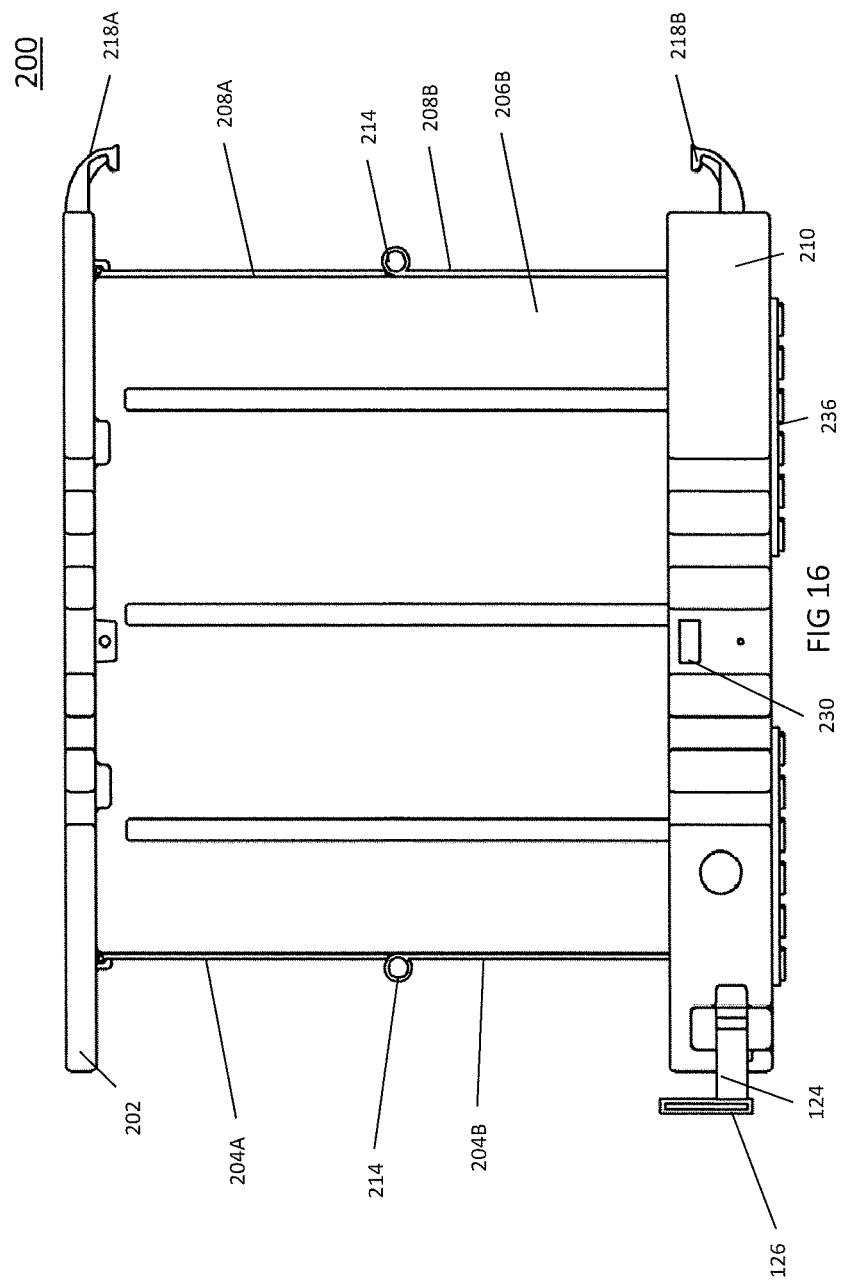
FIG. 16 depicts a left-side view of the alternate tailgate-mounted collapsible storage system while in its expanded configuration, in accordance with embodiments.

FIG. 16 provides a left-side view of tailgate-mounted collapsible storage system 200 in its expanded configuration. This figure provides an excellent view of the two-part front and back panels (204 and 208, respectively). In embodiments like that of tailgate-mounted collapsible storage system 200, one or more of the system's lateral body panels (i.e., front panel 204, back panel 208, and side panels 206A and 206B) may be divided into more than one section with hinges foldably connecting such sections. This may be done in order to enable the tailgate-mounted collapsible storage system to fold into a smaller volume when in its collapsed configuration. In such embodiments, when the system is in its expanded configuration, the constituent hinged panel sections forming the system's lateral body panels are unfolded so that they stack on top of one another edge-to-edge in order to effectively form a single panel. The beginning of this stacked configuration of panel sections can be seen in FIG. 23.

Referring back to FIG. 16, front panel 204 can be seen to be formed of upper front panel 204A whose bottom edge is stacked edge-to-edge on the top edge of lower front panel 204B. Upper front panel 204A and lower front panel 204B are connected along their point of edge-to-edge stacking by hinge 214. Similarly, back panel 208 can be seen to be formed of upper back panel 208A whose bottom edge is tacked edge-to-edge on the top edge of lower back panel 208B, and upper back panel 208A and lower back panel 208B are connected along their point of edge-to-edge stacking by hinge 214. In embodiments, side panels 206 may be attached to bottom panel 210 by a hinge (not visible) while the top side of side panels 206 may be attached to top panel 202 in a slot-and-tab manner. The hinges connecting side panels 206 to bottom panel 210 may enable side walls 206 to be folded inward once disconnected from top plate 202.

As is visible in the view of tailgate-mounted collapsible storage system 200 depicted in FIG. 16, embodiments of tailgate-mounted collapsible storage systems may have their lateral body panels (i.e., front panel 104, side panels 206A and 206B, and back panel 208) attached to top panel 202 and the bottom panel 210 at any suitable location. The body panels do not have to be attached to the top and bottom panels at the very edge of the top and bottom panels. In fact, in many instances this is not ideal. For example, in many embodiments one or both of the top panel and the bottom panel comprise a lip that extends about the edge of said panel. In such embodiments, it may be advantageous to connect the lateral body panels to the top and bottom panels along locations within the lip so that when the lateral body panels fold down during the process of transitioning the system from its expanded configuration to its collapsed configurations those lateral body panels are retained entirely within a volume formed by the top panel, the bottom panel, and their respective lip(s). Such embodiments have the added benefit of reducing the likelihood of exposed folding parts pinching a user or getting snagged on objects while the system is in its collapsed configuration, such as for manual transport.

Figure 17:
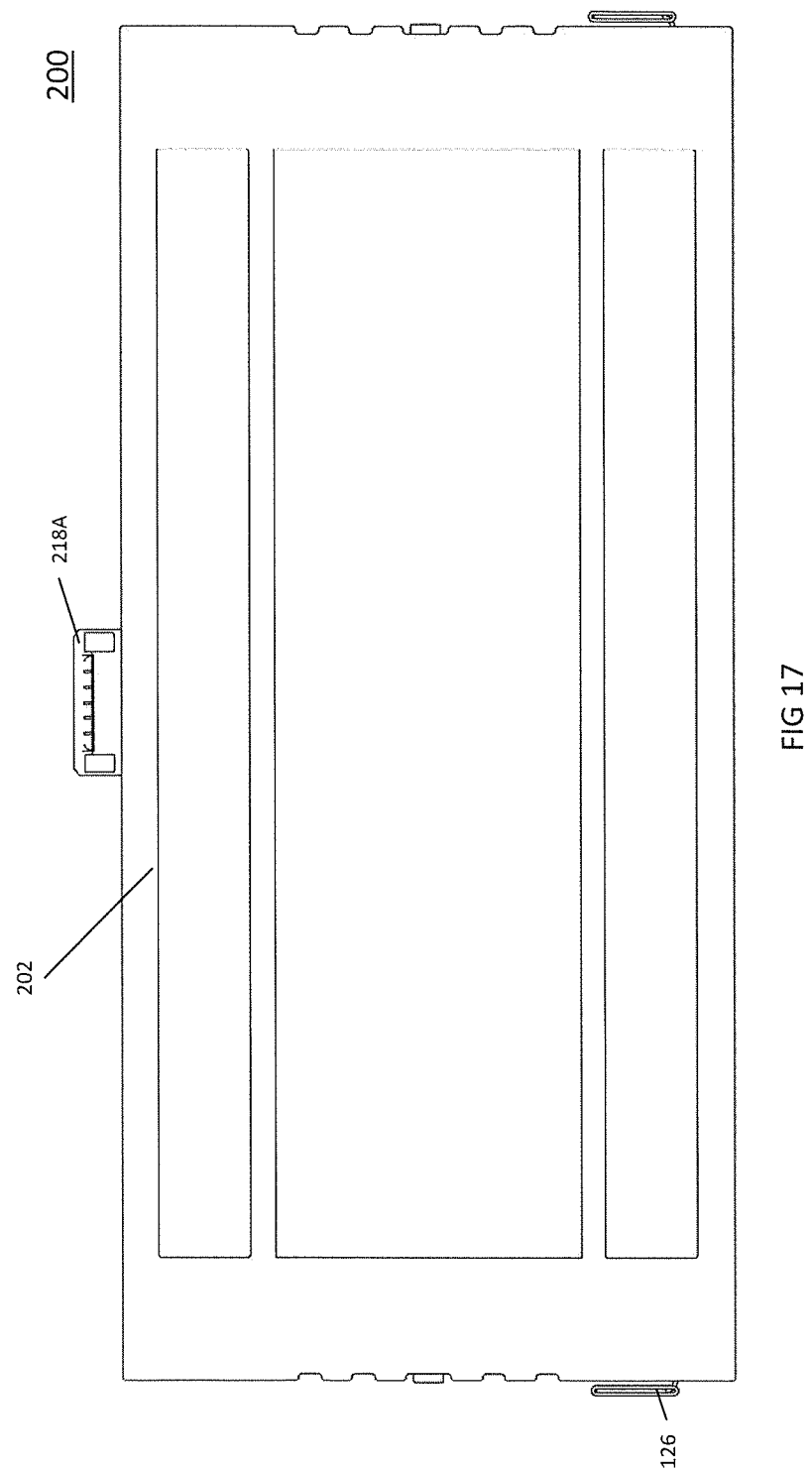
FIG. 17 depicts a top view of the alternate tailgate-mounted collapsible storage system in accordance with embodiments.

FIG. 17 provides a top view of tailgate-mounted collapsible storage system 200.

Figure 18:
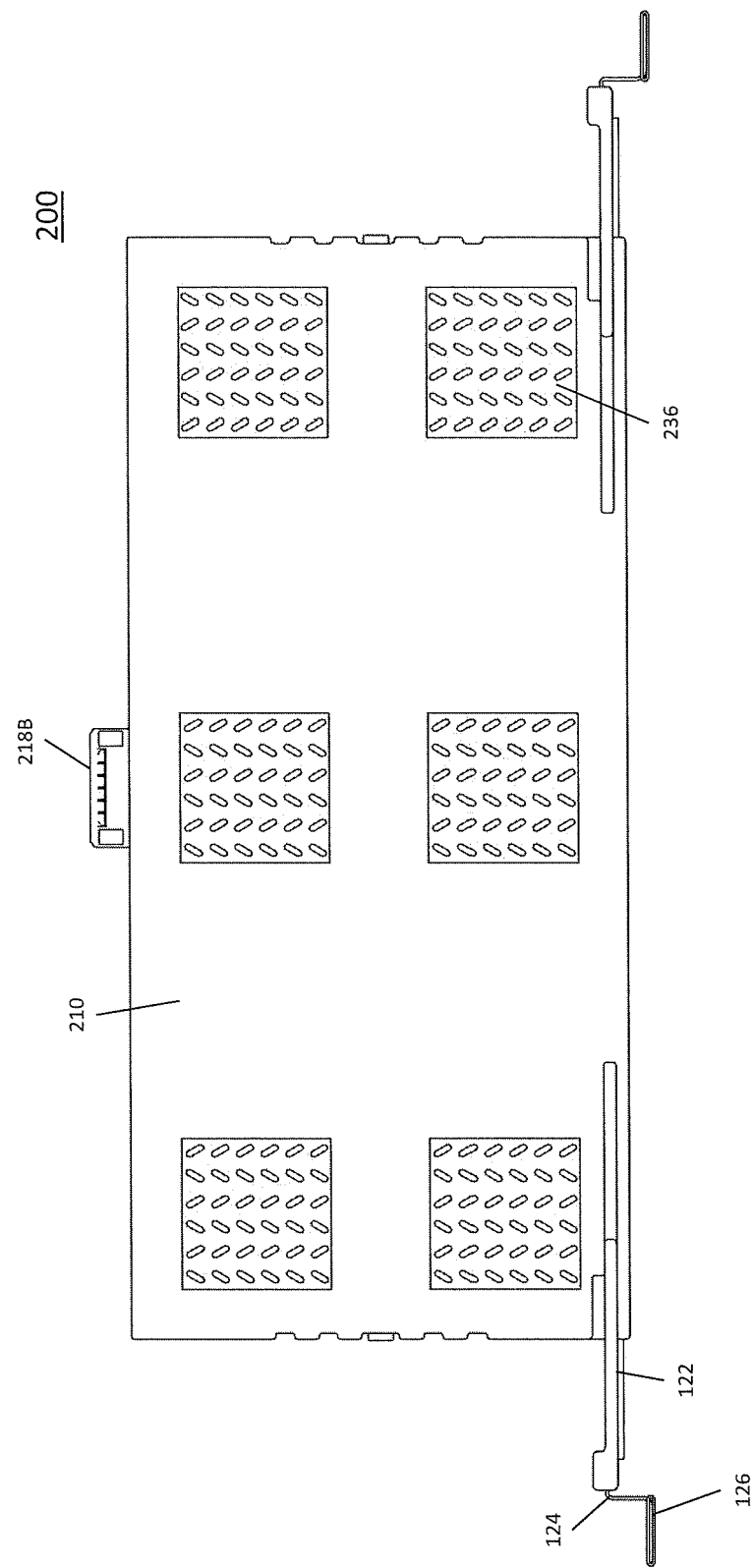
FIG. 18 depicts a bottom view of the alternate tailgate-mounted collapsible storage system in accordance with embodiments.

FIG. 18 provides a bottom view of tailgate-mounted collapsible storage system 200.

Figure 19:
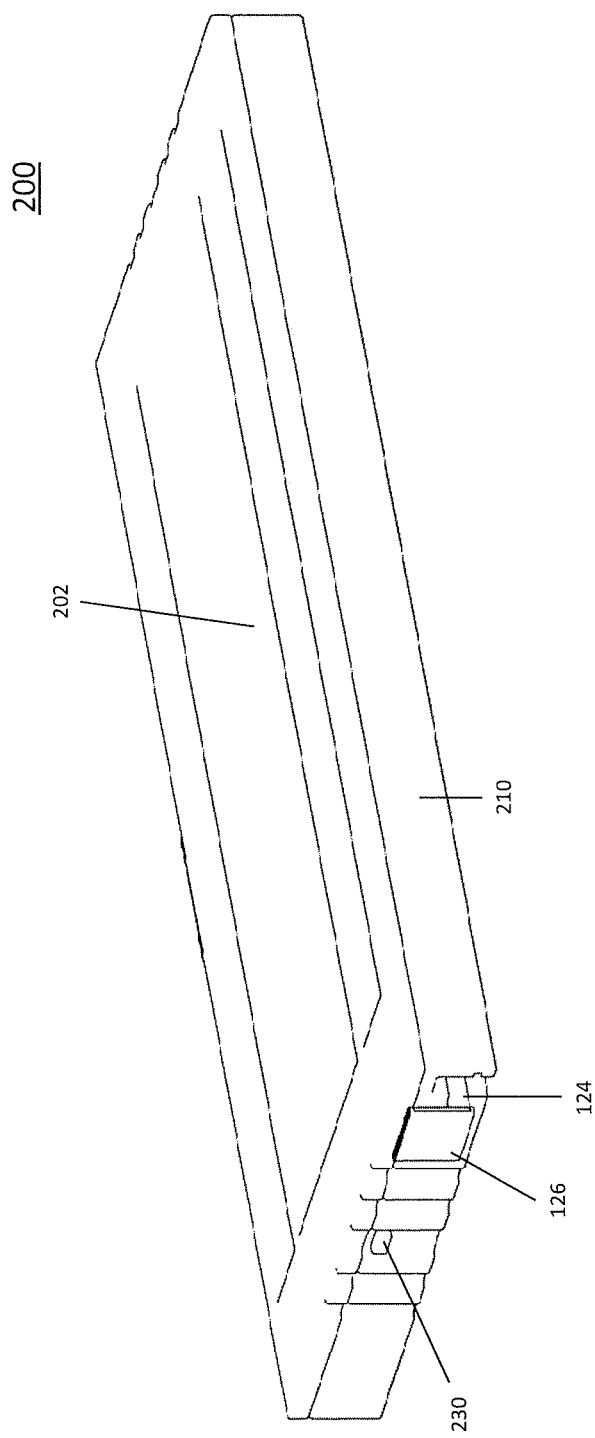
FIG. 19 depicts a front-perspective view of the alternate tailgate-mounted collapsible storage system while in its collapsed configuration, in accordance with embodiments.

FIG. 19 provides a front-perspective view of tailgate-mounted collapsible storage system 200 while it is in its collapsed configuration. It is apparent from this figure that top panel 202 from system 200 comprises a significantly smaller lip than its counterpart, top panel 102 from system 100. This FIG also provides a good view of release 230, which may be actuated to disengage latch (not shown) affixing top panel 202 to bottom panel 210.

Figure 20:
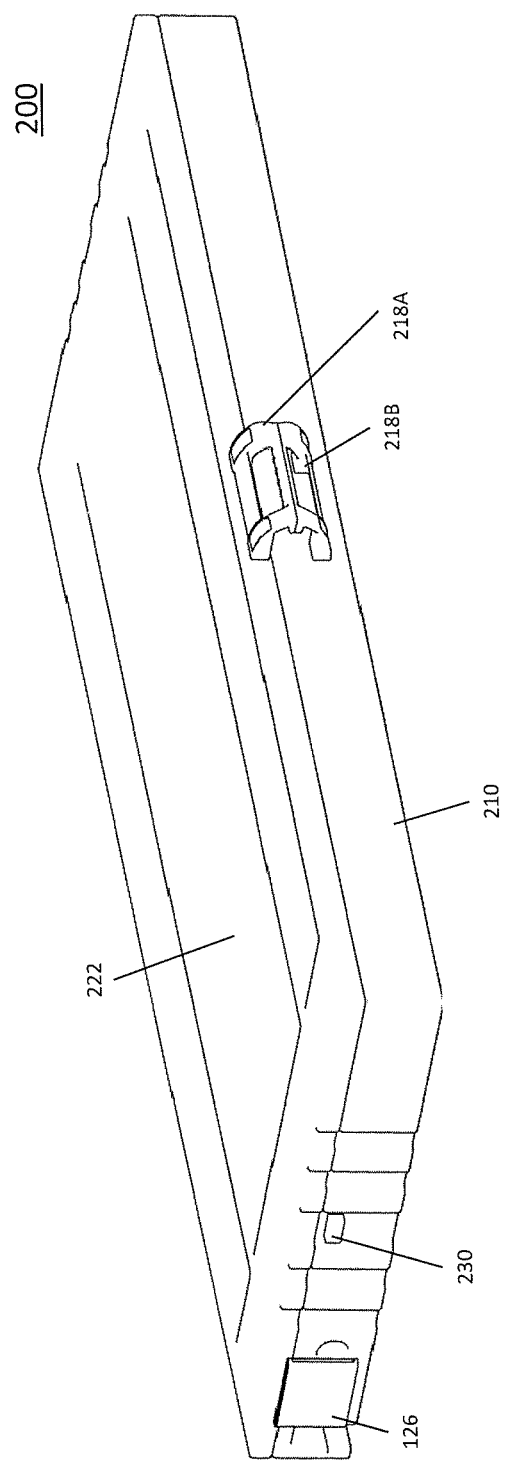
FIG. 20 depicts a back-perspective view of the alternate tailgate-mounted collapsible storage system while in its collapsed configuration, in accordance with embodiments.

FIG. 20 provides a back-perspective view of tailgate-mounted collapsible storage system 200 while it is in its collapsed configuration.

Figure 21:
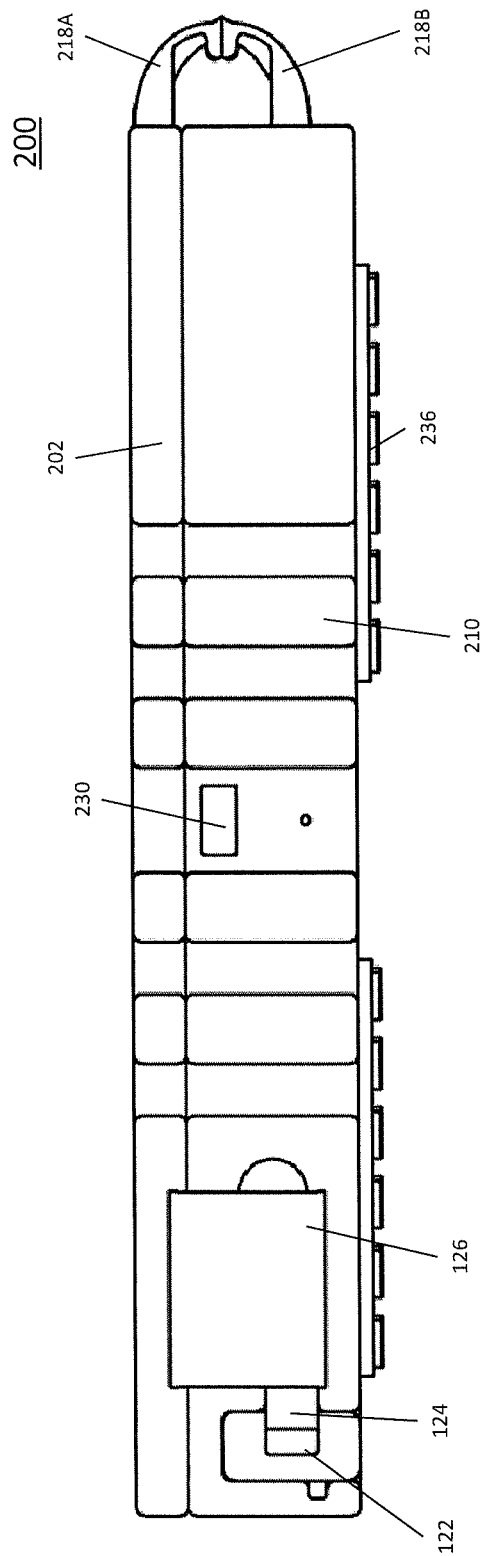
FIG. 21 depicts a left-side view of the alternate tailgate-mounted collapsible storage system while in its collapsed configuration, in accordance with embodiments.

FIG. 21 provides a left-side view of tailgate-mounted collapsible storage system 200 while it is in its collapsed configuration.

Embodiments of the tailgate-mounted collapsible storage system may be configured to be transitionable between an expanded configuration, as may be seen in FIGS. 2-5 and 13-16, wherein the front, side, and back panels are positioned in between, and roughly orthogonal to, each of the top panel and the bottom panel; and a collapsed configuration, as shown in FIGS. 8-10 and 19-21, wherein the front, side and back panels are positioned in between, and roughly parallel to, each of the top panel and the bottom panel.

Figure 22:
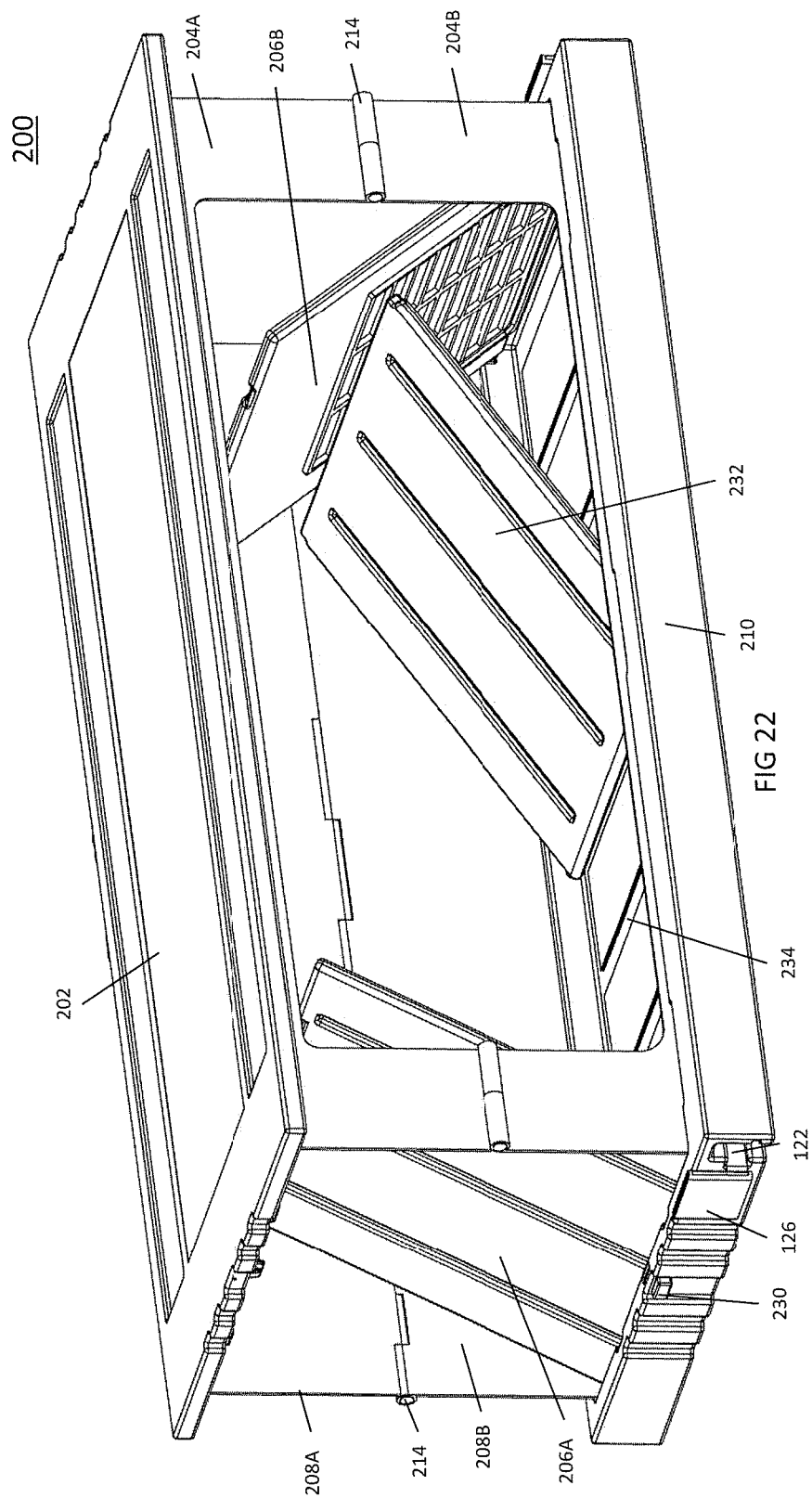
FIG. 22 depicts a front-perspective view of the alternate tailgate-mounted collapsible storage system beginning to transition from its expanded configuration to its collapsed configuration, in accordance with embodiments.

FIG. 22 provides a front-perspective view of tailgate-mounted collapsible storage system 200 as it is beginning to transition from its expanded configuration to its collapsed configuration. Side panels 206A and 206B can be seen having been disconnected from respective attachments to top panel 202 and in the process of rotating inwards and downwards along the hinges (not shown) connecting the bottom edge of each of side panels 206A and 206B to their respective ends of bottom panel 210. Any divider panels in use, such as divider panel 232, may be removed from their respective slot(s) 234 (and any other corresponding slots in other body panels) and may be flat stacked along with side panels 206A and 206B.

Figure 23:
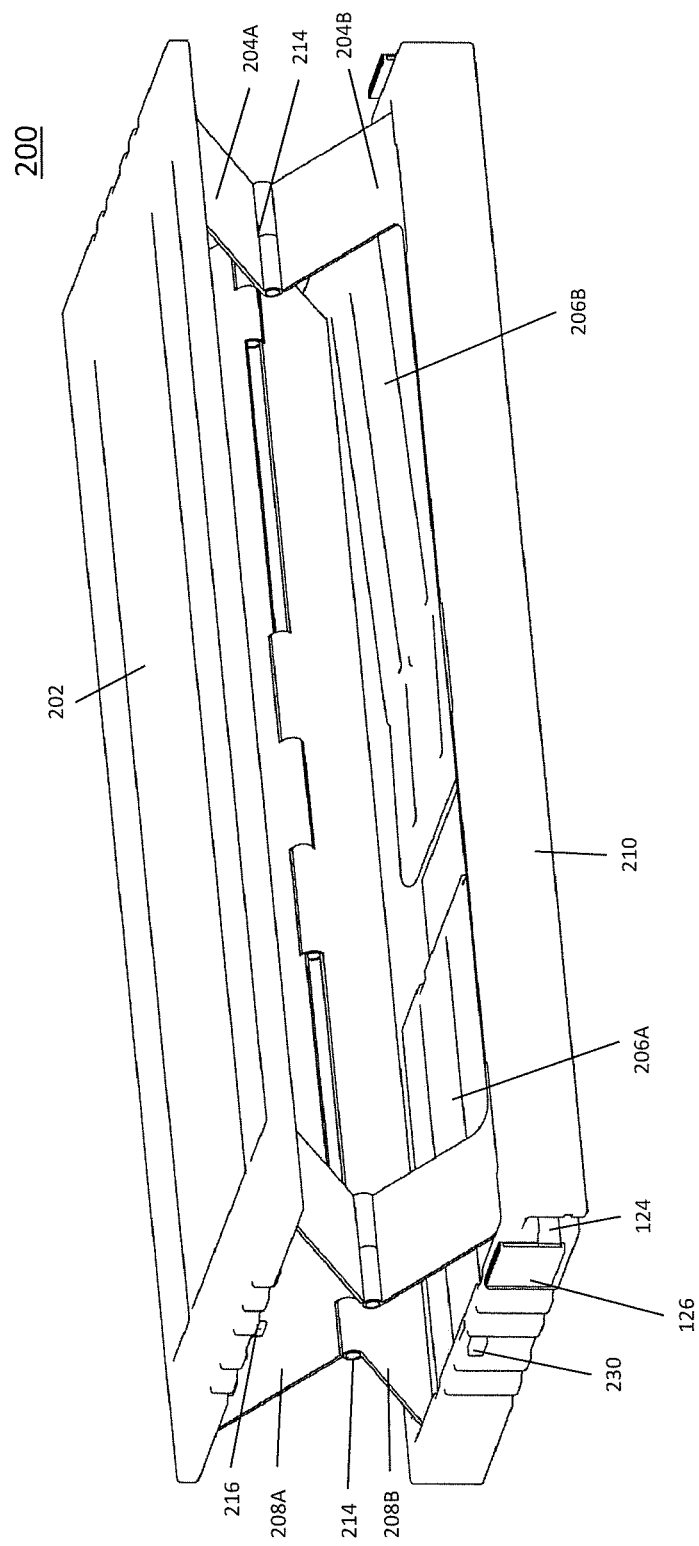
FIG. 23 depicts a front-perspective view of the alternate tailgate-mounted collapsible storage system continuing to transition from its expanded configuration to its collapsed configuration, in accordance with embodiments.

FIG. 23 provides a front-perspective view of tailgate-mounted collapsible storage system 200 further along in the process of being collapsed. When tailgate-mounted collapsible storage system 200 is being collapsed, after side panels 206A and 206B and any divider panel(s) are laid flat on top of the inner surface of the bottom panel 210, front panel 204 and rear panel 208 may be folded in on themselves. Upper front panel 204A and upper back panel 208A may both swing up and in about the hinges (not shown) that attach them to top panel 202, while at the same time, lower front panel 204B and lower back panel 208B may both swing down and in about the hinges (not shown) that attach them to bottom panel 210. Hinges 214 between each of the segmented body panels may be pushed inward and may rotate allowing upper front panel 204A to stack on lower front panel 204B and upper back panel 208A to stack on lower back panel 208B as top panel 202 translates downward to come to rest on bottom panel 210 as tailgate-mounted collapsible storage system 200 finishes being transitioned to its collapsed configuration (visible in FIG. 19-21).

As stated above, the general goal when collapsing a tailgate-mounted collapsible storage system, such as either tailgate-mounted collapsible storage system 100 or tailgate-mounted collapsible storage system 200, is to have it so that the system's lateral body panels, namely the side panels, back panel, and front panel (if present), transition from being positioned substantially orthogonal to the top panel and the bottom panel, to being positioned substantially parallel to, and between, the top panel and the bottom panel.

When the tailgate-mounted collapsible storage system is in its expanded configuration, the interior volume of the tailgate-mounted collapsible storage system, as defined by the boxes body panels, is maximized so that a user can use that interior volume to store materials. When the collapsible storage system is in the collapsed configuration, the lateral panels of the foldable storage box system (the front panel, side panels, and back panel) are folded down, into the interior volume of the storage box system so that the top and bottom panels may abut one another, thereby reducing the interior volume of the system. While a user may not be able to store much if any materials in the tailgate-mounted collapsible storage system while it is in its collapsed configuration, the reduced volume afforded by the collapsed configuration may provide for easier transport and storage of the tailgate-mounted collapsible storage system while it is not in use.

Figure 24:
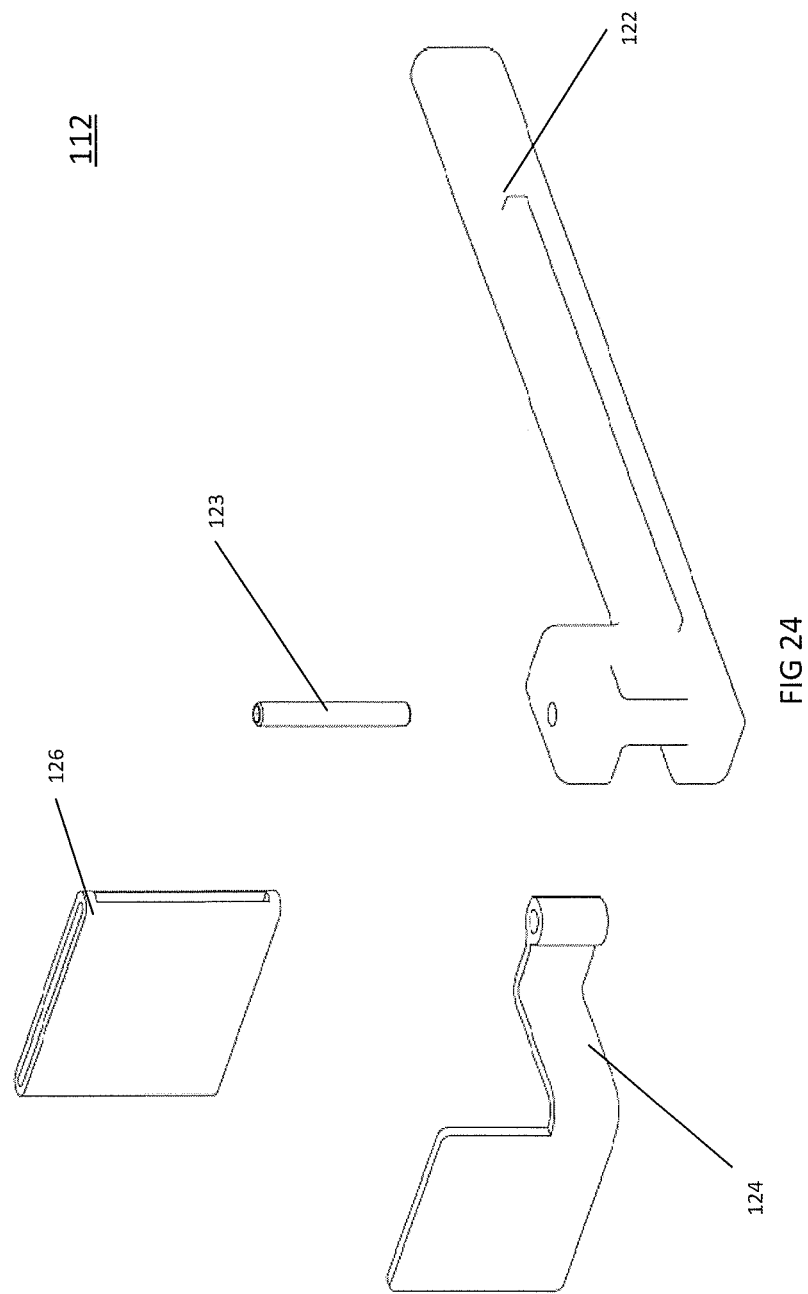
FIG. 24 depicts an exploded view of a mounting system for mounting an un-mounting a tailgate-mounted collapsible storage system to a vehicle using the vehicle's tailgate, in accordance with embodiments.

FIG. 24 provides an exploded view of mounting system 112 for mounting an un-mounting a tailgate-mounted collapsible storage system to a vehicle using the vehicle's tailgate. As discussed hereinabove, the embodiment of a system for mounting an un-mounting a tailgate-mounted collapsible storage system to a vehicle using the vehicle's tailgate depicted as mounting system 112 may comprise arm 122, security hinge 124, and interface surface 126. A proximal end of arm 122 may be affixed to a body panel of a tailgate-mounted collapsible storage system and may be configured to be retractably extended therefrom. A distal end of arm 122 may be connected to security hinge 124. Security hinge 124 may be hingeably connected to arm 122 by pin 123. Interface surface 126 may be fixedly attached to security hinge 124 at its end opposite pin 123. Pin 123 may allow for security hinge 124 and interface surface 126 to rotate about the long axis of pin 123.

Figure 25:
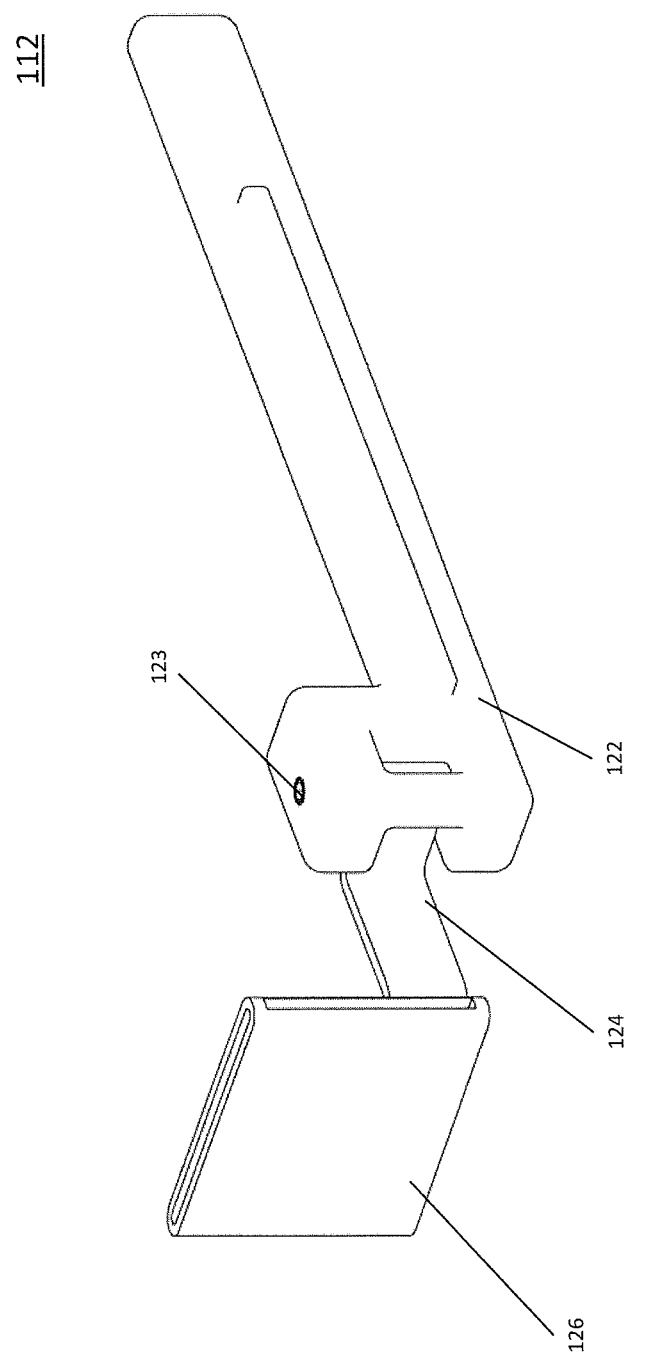
FIG. 25 depicts a front-perspective view of a mounting system for mounting an un-mounting a tailgate-mounted collapsible storage system to a vehicle using the vehicle's tailgate, in accordance with embodiments.

FIG. 25 provides a front-perspective view of mounting system 112.

Figure 26:
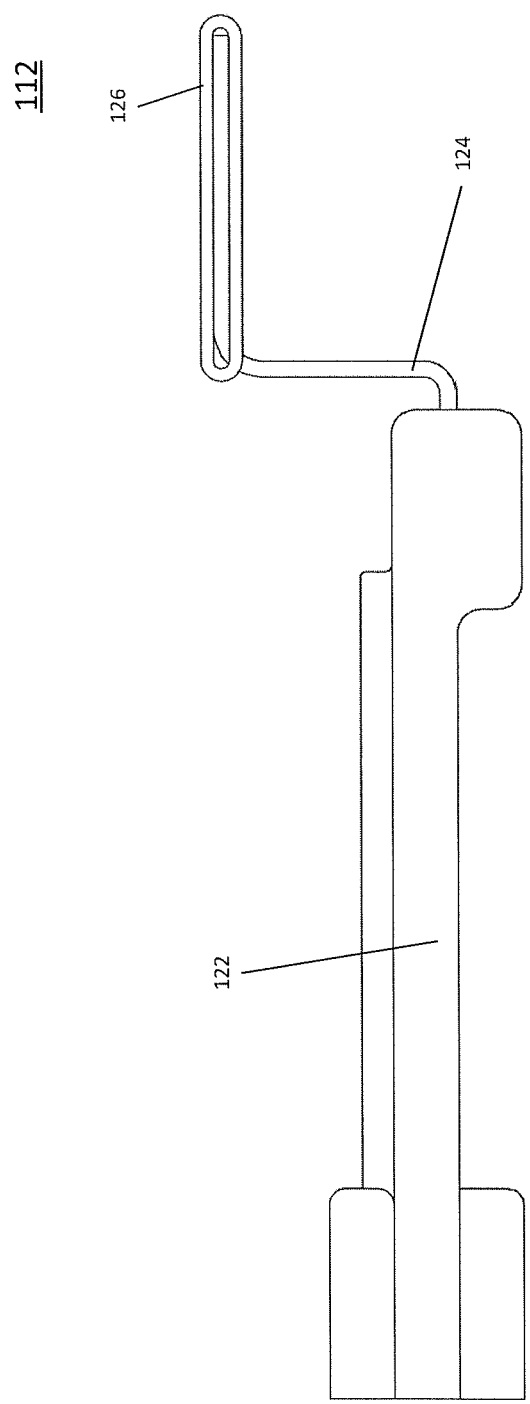
FIG. 26 depicts a top view of a mounting system for mounting an un-mounting a tailgate-mounted collapsible storage system to a vehicle using the vehicle's tailgate, in accordance with embodiments.

FIG. 26 provides a top view of mounting system 112. This perspective provides for a good view of how, in embodiments, arm 122 and interface surface 126 of mounting system 112 can be positioned substantially parallel to one another with security hinge 124 connecting them together.

In embodiments, security hinge 124 may be shaped as necessary so that it may possess the geometry necessary to get interface surface 126 into a suitable position for being wedged between any particular type, brand, or model of vehicle and the vehicle's tailgate when it is closed, or any other suitable shape for its purposes.

While the embodiments of the tailgate-mounted collapsible storage systems depicted in the associated FIGS comprise mounting systems that comprise an arm, a security hinge, and an interface surface, alternate embodiments may comprise interface surfaces that are connected to one or more of the body panels (top, side, back, front, and bottom panels) by alternate or additional structural elements. Embodiment of tailgate-mounted collapsible storage system, may comprise alternate mounting systems, including mounting system systems FIG. 27A shows tailgate-mounted collapsible storage system 100 sitting in the bed of vehicle 300 while tailgate 304 of vehicle 300 is in an open position. Tailgate-mounted collapsible storage system 100 is set in the bed of vehicle 300 such that it is located proximate the inner surface of tailgate 304 when it is in its closed position. With tailgate 304 in its open position, as seen in FIG. 27A, a set of interface pads 126 from tailgate-mounted collapsible storage system 100 can be seen positioned such that a front surface of each interface pad 126 is facing outwards while a back surface of each interface pad 126 is abutting vehicle mounting surface 302. In embodiments, mounting surface 302 may be any suitable surface which is rigid, rigidly attached to vehicle 300, and located in a position proximate a surface of tailgate 304 when it is in its closed position.

Using a mounting system, like mounting system 112, wherein interface surface 126 is placed between the tailgate 304 and vehicle 300 (at tailgate mounting surface 306 and vehicle mounting surface 302, respectively) while tailgate 304 is in its open position, then shutting tailgate 304 to cause interface surface 126 to become trapped between tailgate mounting surface 306 and vehicle mounting surface 302 in an interference fit type mechanical coupling, means that no tools are required to install or uninstall a tailgate-mounted collapsible storage system a vehicle. Instead, securely installing and uninstalling a tailgate-mounted collapsible storage system simply requires opening and/or shutting the vehicle's tailgate.

While the embodiments of the mounting systems depicted in the associated FIGS comprise interface surfaces that are configured to be mounted in between an interior surface of a tailgate and a rear surface of the frame of a vehicle at a set of corresponding points on the left and right rear of the vehicle, it should be understood that a person having ordinary skill in the relevant art would understand that alternate designs of interference plates and mounting systems may provide for the interference plate to be secured between the tailgate and the vehicle's body at different positions and against various suitably interfacing surfaces.

In embodiments, the front panel of a tailgate-mounted collapsible storage system may have an opening to allow for access into the interior volume of the tailgate-mounted collapsible storage system. In certain embodiments, when installed in a vehicle, when the tailgate is moved from its open to its closed position, sandwiching the interface surface between the vehicle mounting surface and the tailgate mounting surface and locking the system in place, the tailgate may form a seal around the opening in the front panel with the front panel such that the interior volume of the tailgate-mounted collapsible storage system is no longer accessible. Essentially, in embodiments, the tailgate of the vehicle may operate as a door to the tailgate-mounted collapsible storage system.

Figure 27B:
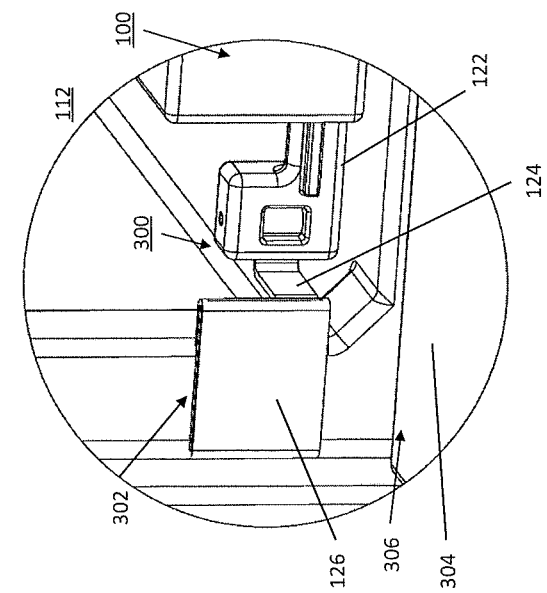
FIG. 27B depicts a zoomed-in view of the location where the mounting system interfaces with the vehicle and the tailgate to secure the tailgate-mounted collapsible storage system to the vehicle while the tailgate is in its open position.
Figure 27A:
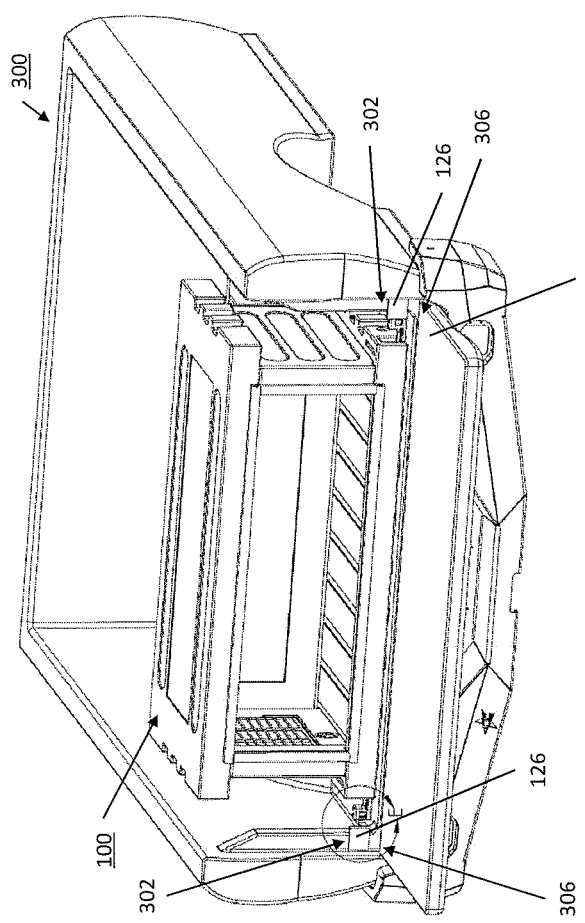
FIG. 27A depicts a first embodiment of a tailgate-mounted collapsible storage system sitting in the bed of a truck with the tailgate in its open position.

FIG. 27B shows a zoomed-in view of the location where mounting system 112 interfaces with vehicle 300 and the tailgate 304 to secure tailgate-mounted collapsible storage system 100 to vehicle 300 while tailgate 304 is in its open position. This view allows for a better look at vehicle mounting surface 302, tailgate mounting surface 306, and how interface surface 126 of mounting system 112 may be positioned relative to vehicle mounting surface 302, and tailgate mounting surface 306 to allow for secure instillation of tailgate-mounted collapsible storage system 100 into vehicle 300 by simply closing tailgate 304. As much of the back surface of interface surface 126 should be abutting the vehicle mounting surface 302 as possible to achieve a secure instillation of tailgate-mounted collapsible storage system 100.

In embodiments, one or both of interface surface 126 and security hinge 124 may be thin to allow for those pieces to be inserted in between closely fitting surfaces vehicle and tailgate surfaces.

FIG. 28 shows tailgate-mounted collapsible storage system 100 installed in the bed of vehicle 300 with tailgate 304 in its closed position, locking tailgate-mounted collapsible storage system 100 in place. As seen in FIG. 28, when fully installed in a vehicle tailgate-mounted collapsible storage system 100 is positioned proximate tailgate 304, rather than proximate the opposite side of the vehicle's bed where the majority of know vehicle storage systems tend to be located.

FIG. 29A shows an alternate view of tailgate-mounted collapsible storage system 100 installed in the bed of vehicle 300 with tailgate 304 in its closed position, locking tailgate-mounted collapsible storage system 100 in place. In this mounting system 112 can be seen extending from tailgate-mounted collapsible storage system 100 and being locked between vehicle 300 and tailgate 304.

FIG. 29B shows a zoomed-in view of the location where mounting system 112 interfaces with vehicle 300 and tailgate 304 to secure tailgate-mounted collapsible storage system 100 to vehicle 300 while tailgate 304 is in its closed position. Arm 122 can be seen extending from tailgate-mounted collapsible storage system 100. Safety hinge 124 can be seen as angled so as to place interface surface 126 in an appropriate position as to be located in between vehicle 300 at vehicle mounting surface 302 and tailgate 304 at tailgate mounting surface 306. With tailgate 304 being in its closed position, this FIG shows a portion of interface surface 126 extending beyond vehicle mounting surface 302, with the remaining occluded portion of interface surface 126 being in active interference fit lock between vehicle 300 and tailgate 304.

Arm 122 of mounting system 112 may be affixed at a first end to a panel of the tailgate-mounted collapsible storage system 100. In embodiments, arm 122 may be extendible, or may translate into and out of a portion of the panel onto which arm 122 is affixed to allow for mounting system 112 to adapt to a variety of different vehicles and tailgate sizes. A second end of arm 122 may be attached to security hinge 124. Security hinge 124 may extend between the distal end of arm 122 and interface surface 126. Security hinge 124 may provide for movement of interface surface 126 about an axis relative to its connection with arm 122. Interface surface 126 is configured to be positioned between a vehicle mounting surface 302, which may be located on the rear-end of vehicle 300, and tailgate mounting surface 306 when tailgate 300 is in the closed position.

By closing tailgate 304 while interface surface 126 is positioned abutting vehicle mounting surface 302 a user can lock a tailgate-mounted collapsible storage system in place by creating an interference lock between tailgate 304, interface surface 126, and vehicle 300 by sandwiching interface surface 126 between vehicle mounting surface 302 and tailgate mounting surface 306, and latching tailgate 304 in place, as during normal operation while in its closed position.

FIG. 30A shows tailgate-mounted collapsible storage system 200 set in the bed of vehicle 300 covered by bedcover 308 with tailgate 304 in its open position. Tailgate-mounted collapsible storage system 200 is set in the bed of vehicle 300 such that it is located proximate the inner surface of tailgate 304 when it is in its closed position. With tailgate 304 in its open position, a set of interface pads 126 from tailgate-mounted collapsible storage system 200 can be seen positioned such that a front surface of each interface pad 126 is facing outwards while a back surface of each interface pad 126 is abutting vehicle mounting surface 302.

FIG. 30B shows a zoomed-in view of the location where mounting system 112 interfaces with vehicle 300 and the tailgate to secure tailgate-mounted collapsible storage system 200 to vehicle 300 while the tailgate is in its open position.

FIG. 31A shows the bed of vehicle 300 with bedcover 308 with a cutout showing tailgate-mounted collapsible storage system 200 installed in the bed of vehicle 300 with tailgate 304 in its closed position.

FIG. 31B shows a zoomed-in view of the location where mounting system 112 interfaces with vehicle 300 and the tailgate to secure tailgate-mounted collapsible storage system 200 to vehicle 300 while the tailgate is in its closed position.

FIG. 32A shows a top view of the bed of vehicle 300 with bedcover 308 with a cutout showing an embodiment of tailgate-mounted collapsible storage system 200 installed in the bed of vehicle 300 with tailgate 304 in its closed position.

FIG. 32B shows a zoomed-in view showing how an interface surface portion of a mounting system may be sandwiched between vehicle 300 at vehicle mounting surface 302 and tailgate 304 at tailgate mounting surface 306 when tailgate 304 is in its closed position, securing tailgate-mounted collapsible storage system 200 to vehicle 300.

What is claimed is:

1. A collapsible storage system comprising:
    a top, a first side, a second side, a back, and a bottom panel;
    wherein the collapsible storage system is configured to reversibility transition between an expanded configuration wherein the first side, second side, and back panels are positioned substantially orthogonal to each of the top and bottom panels, and a collapsed configuration wherein the first side, second side, and back panels are positioned substantially parallel to the top and bottom panels;
    wherein when in the expanded configuration the top, first side, second side, back, and bottom panels define an interior volume of the collapsible storage system, and wherein the top, first side, second side, and bottom panels define an aperture located opposite the back panel; and
    a mounting system for releasably securing the collapsible storage system to a vehicle having a tailgate, comprising:
        a first end and a second end;
        wherein the first end is engaged with at least one of the panels;
        wherein the second end is configured to be engaged between a vehicle mounting surface and a tailgate mounting surface when the tailgate is in a closed position; and
        wherein the mounting system is configured to be translatable into and out of the panel with which it is engaged.

2. The collapsible storage system of claim 1 wherein the engagement between the second end of the mounting system, the vehicle mounting surface, and the tailgate mounting surface when the tailgate is in a closed position comprises an interference fit.

3. The collapsible storage system of claim 1 wherein the second end of the mounting system is further configured to be disengaged from the vehicle mounting surface and the tailgate mounting surface when the tailgate is in an open position.

4. The collapsible storage system of claim 1 further comprising a front panel configured to be positioned and extend between the top and the bottom panels, and the first side and second side panels, located and opposite the back panel when the collapsible storage system is in its expanded configuration.

5. The collapsible storage system of claim 1 wherein at least one of the first side panel, second side panel, and back panel comprise a plurality of subpanels connected by a hinge.

6. The collapsible storage system of claim 5 wherein the hinge connecting a first subpanel to a second subpanel allows for foldable connection therebetween about a length axis of the subpanels.

7. The collapsible storage system of claim 1 further comprising a handle mechanically affixed to each of the top panel and the bottom panel, such that distal ends of the handles abut each other when the system is in its collapsed configuration.

8. The collapsible storage system of claim 1 further comprising a latch comprising a top latch portion and a bottom latch portion, wherein the top latch portion is mechanically affixed to the to the top panel and the bottom latch portion is mechanically affixed to the bottom panel, such that the top and bottom latch portions align and are engageable to lock the top panel to the bottom panel when the system in in its collapsed configuration.

9. The collapsible storage system of claim 7, further comprising a release, wherein the release is configured such that actuation of the release disengages the top latch portion from the bottom latch portion.

10. The collapsible storage system of claim 1 wherein one or more of the first side, second side, and back panels are connected one or more of the bottom and the top panels by a hinge.

11. The collapsible storage system of claim 1 further comprising a divider panel, and wherein at least one of the top, bottom, and back panels comprise a slot configured to disengageably receive a portion of divider panel.

12. The collapsible storage system of claim 1 wherein the first side, second side, and back panels may be stacked on top of each other and retained between the top panel and the bottom panel when the collapsible storage system is in its collapsed configuration.

13. The collapsible storage system of claim 10 wherein one or more of the first side, second side, and back panel may rotate about the hinge to lie flat in between the top panel and the bottom panel when the collapsible storage system is in its collapsed configuration.

14. A method of mounting an object to a vehicle having a tailgate comprising:
   attaching an interface surface to the object such that the interface surface is translatable into and out of the object to which it is attached;
   placing the interface surface in a location wherein a back side of the interface surface is abutting a vehicle mounting surface, and wherein a front side of the interface surface is in a position that will abut a tailgate mounting surface when the tailgate is closed, while the tailgate is in an open position; and
   closing the tailgate to form an interference fit between the tailgate mounting surface, the interface surface, and the vehicle mounting surface.

15. The method of claim 14, wherein the interface surface is translatable in an axis substantially parallel to a width dimension of the vehicle.

* * * * *